US012689478B2

(12) United States Patent (10) Patent No.: US 12,689,478 B2
Ganesan et al. (45) Date of Patent: Jul. 21, 2026

(54) SIDELINK RANGING FOR POSITIONING REFERENCE SIGNAL TYPES

(71) Applicant: Lenovo (Singapore) Pte. Ltd., New Tech Park (SG)

(72) Inventors: Karthikeyan Ganesan, Kronberg im Taunus (DE); Robin Thomas, Frankfurt am Main (DE); Ankit Bhamri, Rödermark (DE); Ali Ramadan Ali, Kraiburg am Inn (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 226 days.

(21) Appl. No.: 18/548,055

(22) PCT Filed: Feb. 25, 2022

(86) PCT No.: PCT/IB2022/051691
§ 371 (c)(1),
(2) Date: Aug. 25, 2023

(87) PCT Pub. No.: WO2022/180597
PCT Pub. Date: Sep. 1, 2022

(65) Prior Publication Data
US 2024/0137173 A1 Apr. 25, 2024
US 2024/0235766 A9 Jul. 11, 2024

Related U.S. Application Data

(60) Provisional application No. 63/153,844, filed on Feb. 25, 2021.

(51) Int. Cl.
*H04L 5/00* (2006.01)

(52) U.S. Cl.
CPC ............ *H04L 5/005* (2013.01); *H04L 5/0094* (2013.01)

(58) Field of Classification Search
None
See application file for complete search history.

(56) References Cited

U.S. PATENT DOCUMENTS

2016/0095080 A1 3/2016 Khoryaev et al.
2020/0154449 A1 5/2020 Akkarakaran et al.
(Continued)

FOREIGN PATENT DOCUMENTS

WO 2017027450 A1 2/2017
WO 2020251318 A1 12/2020

OTHER PUBLICATIONS

3GPP, "3rd Generation Partnership Project; Technical Specification Group Services and System Aspects; Study on enhancements for cyber-physical control applications in vertical domains; Stage 1 (Release 17)", 3GPP TR 22.832. V17.3.0, Sep. 2020, p. 1-87.
(Continued)

*Primary Examiner* — Phirin Sam
(74) *Attorney, Agent, or Firm* — Kunzler Needham Hilton

(57) ABSTRACT

Various aspects of the present disclosure relate to sidelink ranging for positioning reference signal types. One apparatus includes at least one memory and at least one processor that is configured to receive a positioning reference signal ("PRS") configuration for at least one PRS type for transmitting a PRS to at least one second network equipment, receive a resource pool configuration for transmitting the PRS associated with relative positioning measurements, receive a multiplexing configuration for multiplexing a physical sidelink control channel ("PSCCH") with the PRS, multiplex the PSCCH with the PRS according to the multiplexing configuration, and transmit the multiplexed PSCCH and PRS to the at least one second network equip-
(Continued)

Network Apparatus
1200

Processor
1205

Memory
1210

Input Device
1215

Output Device
1220

Transceiver 1225

Transmitter
1230

Receiver
1235

Network Interface(s)
1240

Application Interface(s)
1245 ment according to the PRS configuration and the resource pool configuration.

20 Claims, 14 Drawing Sheets

(56) References Cited

U.S. PATENT DOCUMENTS

| | | | |
|---|---|---|---|
| 2022/0131727 A1* | 4/2022 | Khoryaev | H04L 27/261 |
| 2022/0191830 A1* | 6/2022 | Khoryaev | H04L 27/261 |
| 2022/0229146 A1 | 7/2022 | Ko et al. | |
| 2024/0056997 A1* | 2/2024 | Hoang | H04W 64/00 |
| 2024/0163836 A1* | 5/2024 | Khoryaev | H04L 5/0051 |
| 2024/0291609 A1* | 8/2024 | Rao | H04L 5/0053 |
| 2025/0184953 A1* | 6/2025 | Baek | H04L 5/0078 |

OTHER PUBLICATIONS

PCT/IB2022/051691, "International Search Report and the Written Opinion of the International Searching Authority, or the Declaration", International Searching Authority, Aug. 26, 2022, pp. 1-10.
LG Electronics et al., "New SID: Study on use cases, scenarios, and requirements of sidelink positioning", 3GPP TSG RAN Meeting #88e RP-200859, Jun. 29-Jul. 3, 2020, pp. 1-4.
3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.
3GPP, "3rd Generation Partnership Project; Technical Specification Group Services and System Aspects; Service requirements for cyber-physical control applications in vertical domains; Stage 1 (Release 17)", 3GPP TS 22.104 V17.4.0, Sep. 2020, pp. 1-76.
3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.
3GPP, "3rd Generation Partnership Project; Technical Specification Group Services and System Aspects; Service requirements for the 5G system; Stage 1 (Release 18)", 3GPP TS 22.261 V18.1.1, Jan. 2021, pp. 1-85.
3GPP, "3rd Generation Partnership Project; Technical Specification Group Radio Access Network; LTE Positioning Protocol (LPP) (Release 16)", 3GPP TS 37.355 V16.3.0, Dec. 2020, pp. 1-298.
3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
3GPP, "3rd Generation Partnership Project; Technical Specification Group Radio Access Network; NR; Physical layer measurements (Release 16)", 3GPP TS 38.215 V16.4.0, Dec. 2020, pp. 1-25.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.3.0, Dec. 2020, pp. 1-118.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

```
                              DL-TOA Measurement Report 750
-- ASN1START

NR-DL-TDOA-SignalMeasurementInformation-r16 ::= SEQUENCE {
    dl-PRS-ReferenceInfo-r16     DL-PRS-IdInfo-r16,
    nr-DL-TDOA-MeasList-r16          NR-DL-TDOA-MeasList-r16,
    ...
}

NR-DL-TDOA-MeasList-r16 ::= SEQUENCE (SIZE(1..nrMaxTRPs-r16)) OF
                            NR-DL-TDOA-MeasElement-r16

NR-DL-TDOA-MeasElemnt-r16 ::= SEQUENCE {
    trp-ID-r16                   TRP-ID-r16,
    nr-DL-PRS-ResourceId-r16     NR-DL-PRS-ResourceId-r16            OPTIONAL,
    nr-DL-PRS-ResourceSetId-r16     NR-DL-PRS-ResourceSetId-r16     OPTIONAL,
    nr-TimeStamp-r16             NR-TimeStamp-r16,
    nr-RSTD-r16                  CHOICE {
            k0-r16              INTEGER (0..1970049),
            k1-r16              INTEGER (0..985025),
            k2-r16              INTEGER (0..492513),
            k3-r16              INTEGER (0..246257),
            k4-r16              INTEGER (0..123129),
            k5-r16              INTEGER (0..61565),
            ...
    },
    nr-AdditionalPathList-r16        NR-AdditionalPathList-r16      OPTIONAL,
    nr-TimingQuality-r16         NR-TimingQuality-r16,
    nr-DL-PRS-RSRP-Result-r16        INTEGER (0..126)               OPTIONAL,
    nr-DL-TDOA-AdditionalMeasurements-r16
                            NR-DL-TDOA-AdditionalMeasurements-r16   OPTIONAL,
    ...
}

NR-DL-TDOA-AdditionalMeasurements-r16 ::= SEQUENCE (SIZE (1..3)) OF
                                NR-DL-TDOA-AdditionalMeasurementElement-r16

NR-DL-TDOA-AdditionalMeasurementElement-r16 ::= SEQUENCE {
    nr-DL-PRS-ResourceId-r16     NR-DL-PRS-ResourceId-r16           OPTIONAL,
    nr-DL-PRS-ResourceSetId-r16     NR-DL-PRS-ResourceSetId-r16     OPTIONAL,
    nr-TimeStamp-r16             NR-TimeStamp-r16,
    nr-RSTD-ResultDiff-r16           CHOICE {
            k0-r16              INTEGER (0..8191),
            k1-r16              INTEGER (0..4095),
            k2-r16              INTEGER (0..2047),
            k3-r16              INTEGER (0..1023),
            k4-r16              INTEGER (0..511),
            k5-r16              INTEGER (0..255),
            ...
    },
    nr-TimingQuality-r16         NR-TimingQuality-r16,
    nr-DL-PRS-RSRP-ResultDiff-r16    INTEGER (0..61)                OPTIONAL,
    nr-AdditionalPathList-r16        NR-AdditionalPathList-r16      OPTIONAL,
    ...
}

-- ASN1STOP
```

FIG. 7B

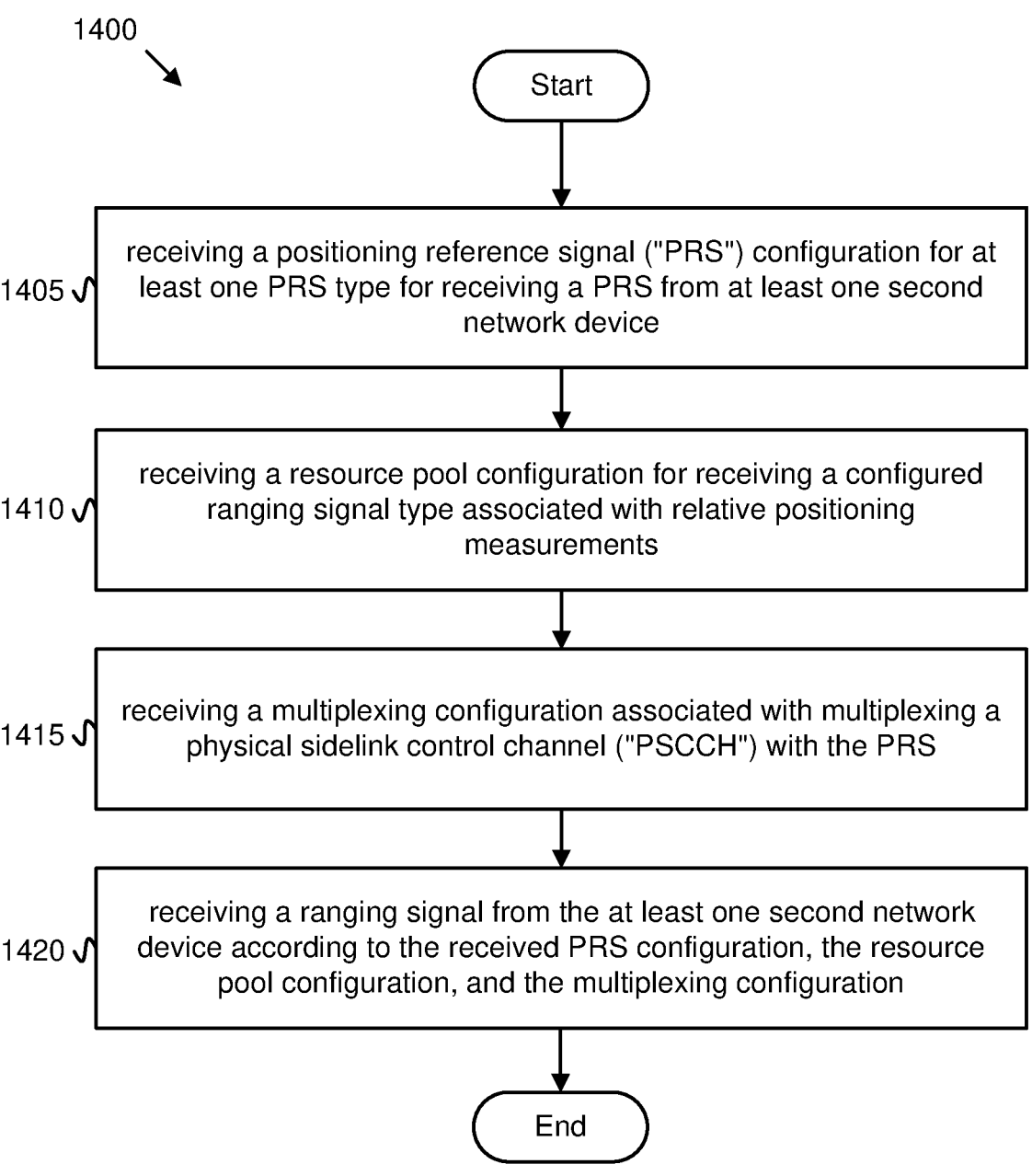

1400

Start

1405 ✓ | receiving a positioning reference signal ("PRS") configuration for at least one PRS type for receiving a PRS from at least one second network device 1410 ✓ | receiving a resource pool configuration for receiving a configured ranging signal type associated with relative positioning measurements 1415 ✓ | receiving a multiplexing configuration associated with multiplexing a physical sidelink control channel ("PSCCH") with the PRS 1420 ✓ | receiving a ranging signal from the at least one second network device according to the received PRS configuration, the resource pool configuration, and the multiplexing configuration End

FIG. 14

SIDELINK RANGING FOR POSITIONING REFERENCE SIGNAL TYPES

CROSS-REFERENCE TO RELATED APPLICATIONS

This application claims the benefit of U.S. Provisional Patent Application No. 63/153,844, entitled "SIDELINK RANGING FOR POSITIONING REFERENCE SIGNAL TYPES" and filed on Feb. 25, 2021, for Karthikeyan Ganesan et al., which is incorporated herein by reference.

FIELD

The subject matter disclosed herein relates generally to wireless communications and more particularly relates to sidelink ranging for positioning reference signal types.

BACKGROUND

In certain wireless communication systems, although there exists a third-generation partnership project ("3GPP") positioning framework, which enables user equipment ("UE")-assisted and UE-based positioning methods, there is currently a lack of support for efficient UE-to-UE range determination, which is essential to support relative positioning applications.

BRIEF SUMMARY

Disclosed are procedures for sidelink ranging for positioning reference signal types. The procedures may be implemented by apparatus, systems, methods, or computer program products.

In one embodiment, a first apparatus includes transceiver that receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the first apparatus includes a processor that multiplexes the PSCCH with the PRS according to the multiplexing configuration. In one embodiment, the transceiver transmits the multiplexed PSCCH and PRS to the at least one second device according to the PRS configuration and the resource pool configuration.

In one embodiment, a first method receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the first method multiplexes the PSCCH with the PRS according to the multiplexing configuration. In one embodiment, the first method transmits the multiplexed PSCCH and PRS to the at least one second device according to the PRS configuration and the resource pool configuration.

In one embodiment, a second apparatus includes a transceiver that receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

In one embodiment, a second method receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7B is one embodiment of DL-TDOA measurement report;

FIG. 14 is a block diagram illustrating one embodiment of a second method for sidelink ranging for positioning reference signal types.

DETAILED DESCRIPTION

Figure 1:
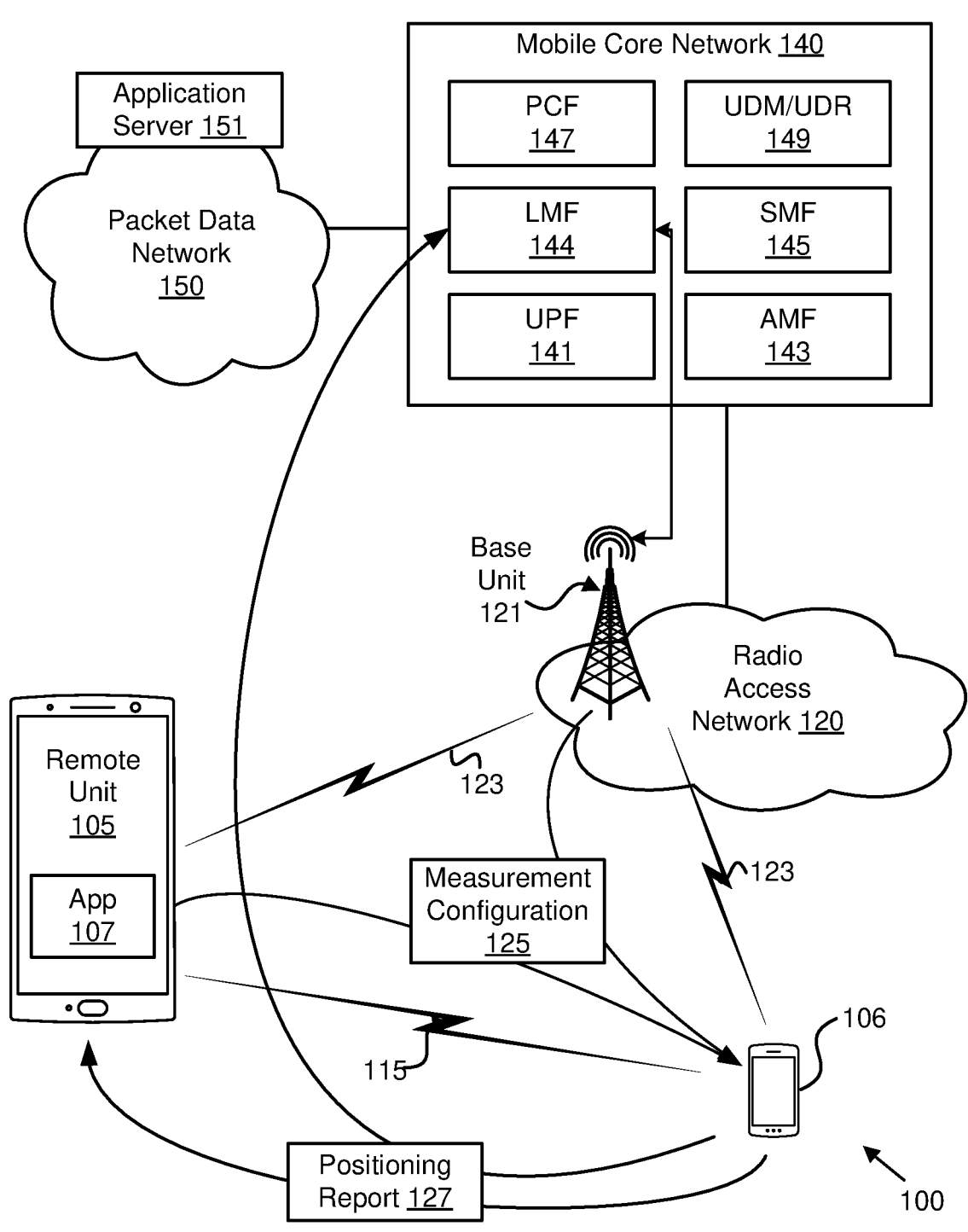
FIG. 1 is a schematic block diagram illustrating one embodiment of a wireless communication system for sidelink ranging for positioning reference signal types.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for sidelink ranging for positioning reference signal types. In certain embodiments, the methods may be performed using computer code embedded on a computer-readable medium. In certain embodiments, an apparatus or system may include a computer-readable medium containing to computer-readable code which, when executed by a processor, causes the apparatus or system to perform at least a portion of the below described solutions.

Although there exists a 3GPP positioning framework, which enables UE-assisted and UE-based positioning methods, there is currently a lack of support for efficient UE-to-UE range determination, which is essential to support relative positioning applications. The present disclosure presents a ranging signal configuration for the transmission of different positioning reference signal ("PRS") types, which offers high-precision accuracy for determining the range and relative orientation between UEs. In one embodiment, the present disclosure describes the ranging signal configuration in a resource pool and dynamic indication of ranging parameters for the sidelink devices.

The solutions proposed herein include a resource pool configuration that includes configuration of one or more PRS types, bitmaps in terms of logical sidelink slot/symbols are (pre)configured for each PRS type, root sequences of the PRS type 2, pulse durations for the pulse sequence for the PRS type 3, positioning report processing defined in terms of symbols/slots offset for each of the PRS type, and/or positioning report processing defined in terms of symbols/slot offset for each of the positioning methods. PSFCH and/or PSSCH symbol and periodicity configuration are defined for the PRS resource pool.

In one embodiment, the solutions describe SCI signaling that contains a PRS type, a cyclic shift value or identifier for PRS type 2, and/or a number of pulse transmissions in a logical sidelink slot/mini-slot. In one embodiment, various multiplexing options describing PSCCH and each of the PRS type are described. In one embodiment, adaption of the transmit power of the pulse transmission based on the CBR is also disclosed.

FIG. 1 depicts a wireless communication system 100 for sidelink ranging for positioning reference signal types, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TB") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

To establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, e.g., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (e.g., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 144, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration of the UPF 141 for proper traffic routing.

The LMF 144 receives positioning measurements or estimates from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 may be an initiator device and transmits a positioning measurement configuration 125 to a responder device 106. In some embodiments, the initiator device may be a base unit 121, e.g., a gNB. In one embodiment, the initiator device receives a positioning/measurement report 127 from the responder device 106. In one embodiment, the initiator device sends the measurement configuration, and/or other configurations, and receives the positioning report 127 over a sidelink connection 115 between the initiator device and the responder device 106. As used herein, a sidelink connection 115 allows remote units 105 to communicate directly with each other (e.g., device-to-device communication) using sidelink (e.g., V2X communication) signals.

While FIG. 1 depicts components of a 5G RAN and a 5G core network, the described embodiments for sidelink ranging for positioning reference signal types apply to other types of communication networks and RATs, including IEEE 802.11 variants, Global System for Mobile Communications ("GSM", e.g., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting sidelink ranging for positioning reference signal types.

Figure 2:
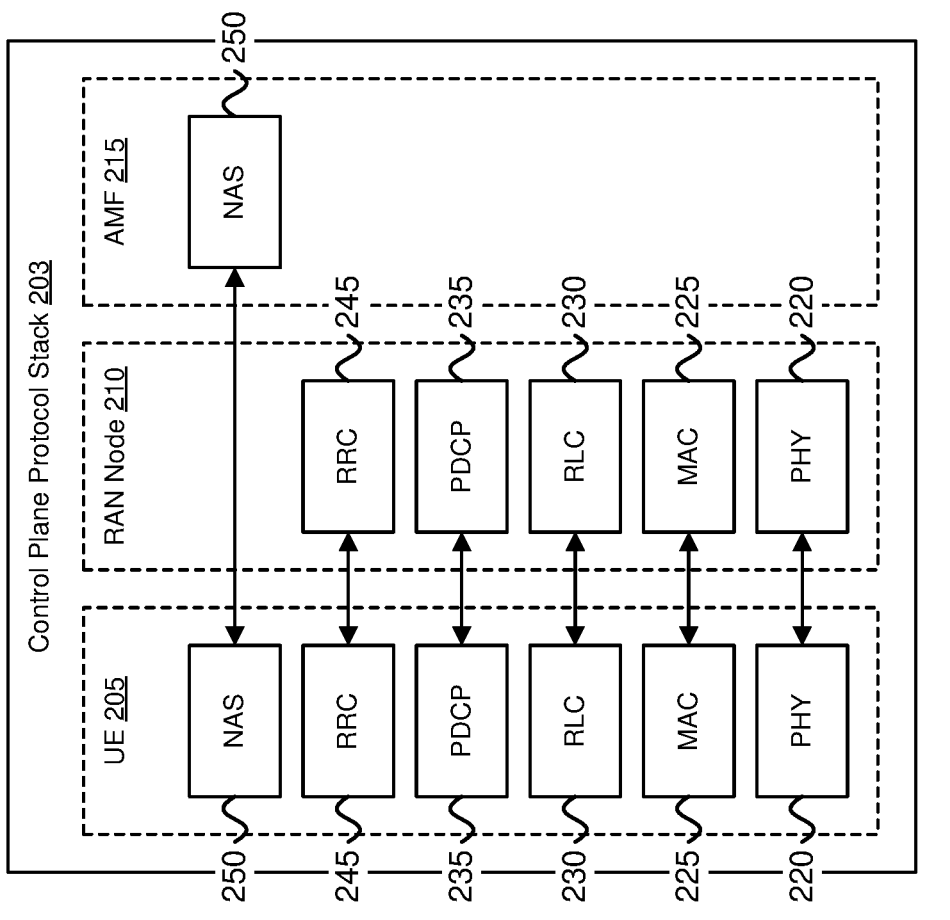
FIG. 2 is a block diagram illustrating one embodiment of a 5G New Radio ("NR") protocol stack.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, for Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting.

TABLE 1

| | | | | | | |
|---|---|---|---|---|---|---|
| IIoT Positioning Performance Requirements | | | | | | |
| Scenario | Horizontal accuracy | Vertical accuracy | Availability | Latency for position estimation of UE | UE Speed | Corresponding Positioning Service Level |
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |
| Inbound logistics for manufacturing (for storage of goods) | <20 cm | <20 cm | 99% | <1 s | <30 km/h | Service Level 7 |

Some UE positioning techniques supported in Rel-16 are listed in Table 2. The separate positioning techniques as indicated in Table 2 may be currently configured and performed based on the requirements of the LMF and/or UE capabilities. Note that Table 2 includes TBS positioning based on PRS signals, but only observed time difference of arrival ("OTDOA") based on LTE signals is supported. The E-CID includes Cell-ID for NR method. The Terrestrial Beacon System ("TBS") method refers to TBS positioning based on Metropolitan Beacon System ("MBS") signals.

TABLE 2

| Supported Rel-16 UE positioning methods | | | | |
|---|---|---|---|---|
| Method | UE-based | UE-assisted, LMF-based | NG-RAN node assisted | Secure User Plane Location ("SUPL") |
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AOD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

The transmission of PRS enable the UE to perform UE positioning-related measurements to enable the computation of a UE's location estimate and are configured per Transmission Reception Point ("TRP"), where a TRP may transmit one or more beams.

Figure 3:
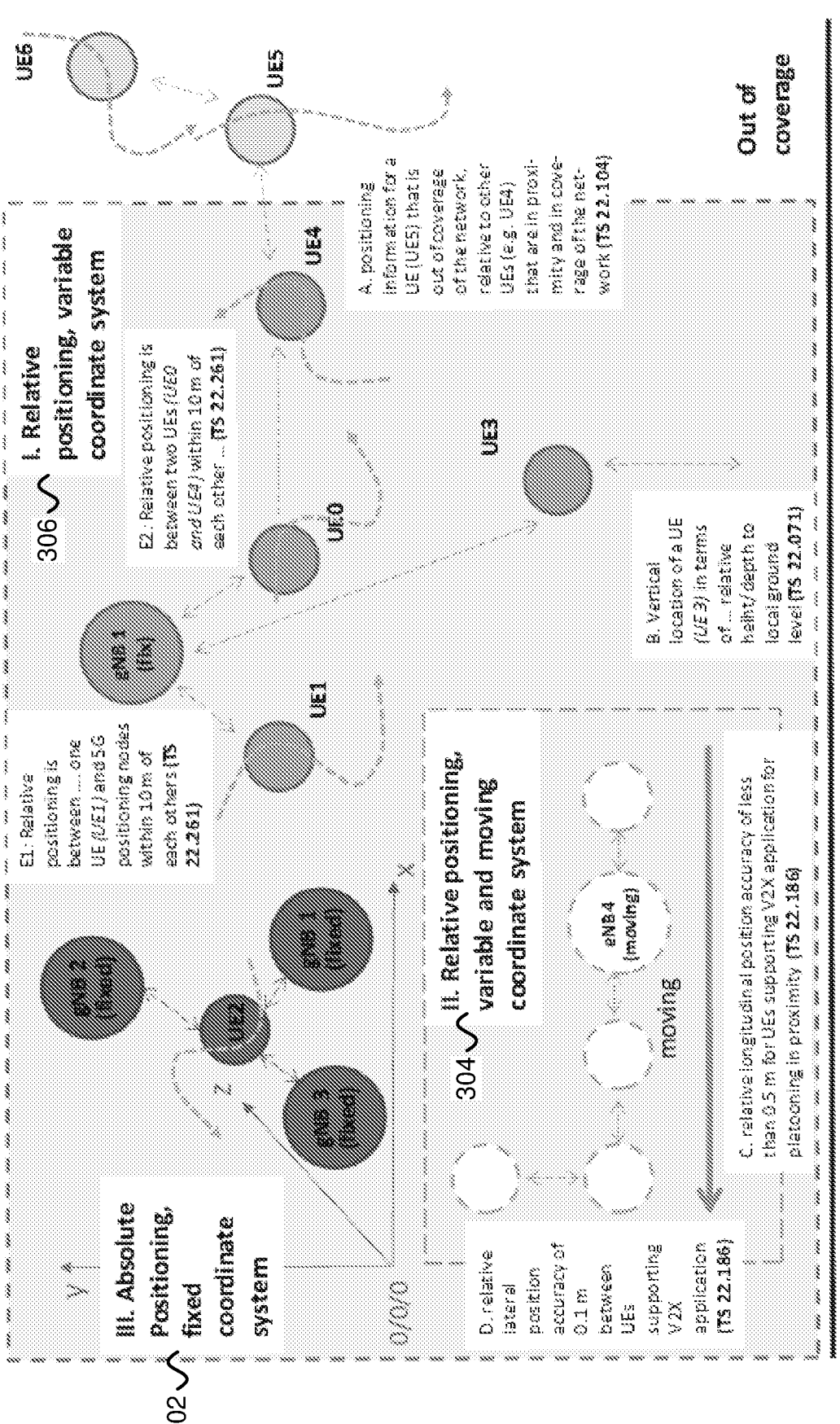
FIG. 3 is a diagram depicting an overview on absolute and relative positioning as defined in Stage 1 specifications.

FIG. 3 depicts one an overview of one embodiment of the absolute and relative positioning scenarios as defined in the architectural (stage 1) specifications using three different co-ordinate systems: Absolute Positioning, fixed coordinate systems 302; Relative Positioning, variable and moving coordinate system 304; and Relative Positioning, variable coordinate system 306.

In one embodiment, the following RAT-dependent positioning techniques may be supported by the system 100:

DL-TDoA: The downlink time difference of arrival ("DL-TDOA") positioning method makes use of the DL RS Time Difference ("RSTD") (and optionally DL PRS RS Received Power ("RSRP") of DL PRS RS Received Quality ("RSRQ")) of downlink signals received from multiple TPs, at the UE (e.g., remote unit 105). The UE measures the DL RSTD (and optionally DL PRS RSRP) of the received signals using assistance data received from the positioning server, and the resulting measurements are used along with other configuration information to locate the UE in relation to the neighboring Transmission Points ("TPs").

DL-AoD: The DL Angle of Departure ("AoD") positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

Figure 4:
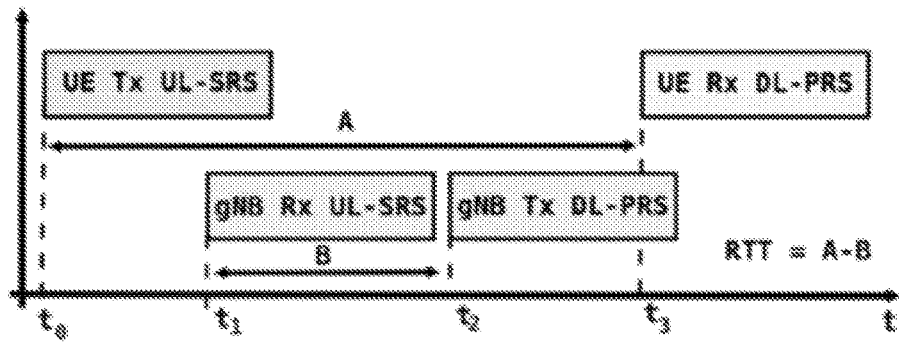
FIG. 4 is a diagram illustrating one embodiment of a Multi-Cell RTT procedure.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE and the gNB Rx-Tx measurements (e.g., measured by RAN node) and UL SRS-RSRP at multiple TRPs of uplink signals transmitted from UE, as shown in FIG. 4.

Figure 5:
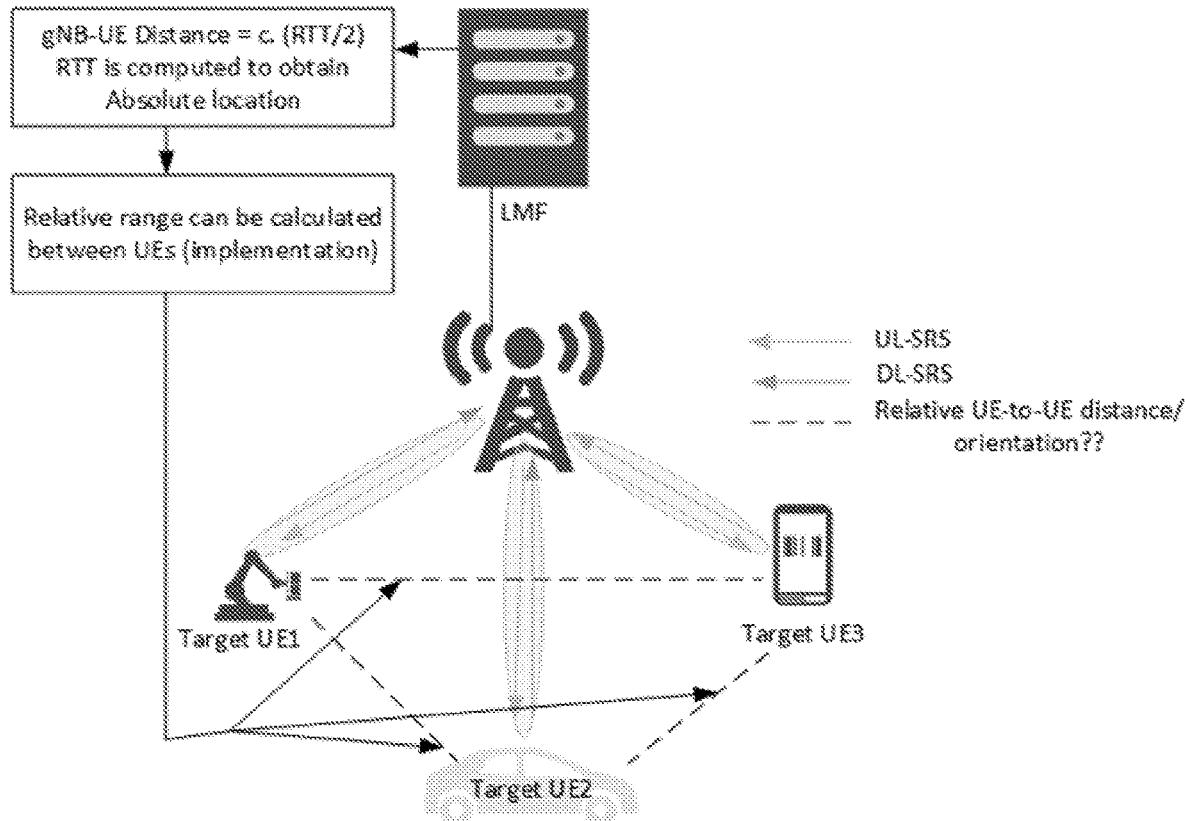
FIG. 5 is a diagram illustrating one embodiment of relative range estimation using the existing single gNB RTT positioning framework.

As shown in FIG. 5, the UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE. In one embodiment, Multi-RTT is only supported for UE-assisted/NG-RAN assisted positioning techniques, as noted in Table 2.

E-CID/NR E-CID. Enhanced Cell ID ("CID") positioning method, the position of a UE is estimated with the knowledge of its serving ng-eNB, gNB and cell and is based on LTE signals. The information about the serving ng-eNB, gNB and cell may be obtained by paging, registration, or other methods. NR Enhanced Cell ID ("NR E-CID") positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning; e.g., the positioning procedures do not supply a measurement configuration or measurement control message, and the UE reports the measurements that it has available rather than being required to take additional measurement actions.

UL-TDoA: The UL TDOA positioning method makes use of the UL TDOA (and optionally UL SRS-RSRP) at multiple reception points ("RPs") of uplink signals transmitted from the UE. The RPs measure the UL TDOA (and optionally UL SRS-RSRP) of the received signals using assistance data received from the positioning server, and the resulting measurements are used along with other configuration information to estimate the location of the UE.

UL-AoA: The UL Angle of Arrival ("AoA") positioning method makes use of the measured azimuth and the zenith angles of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

Figure 6:
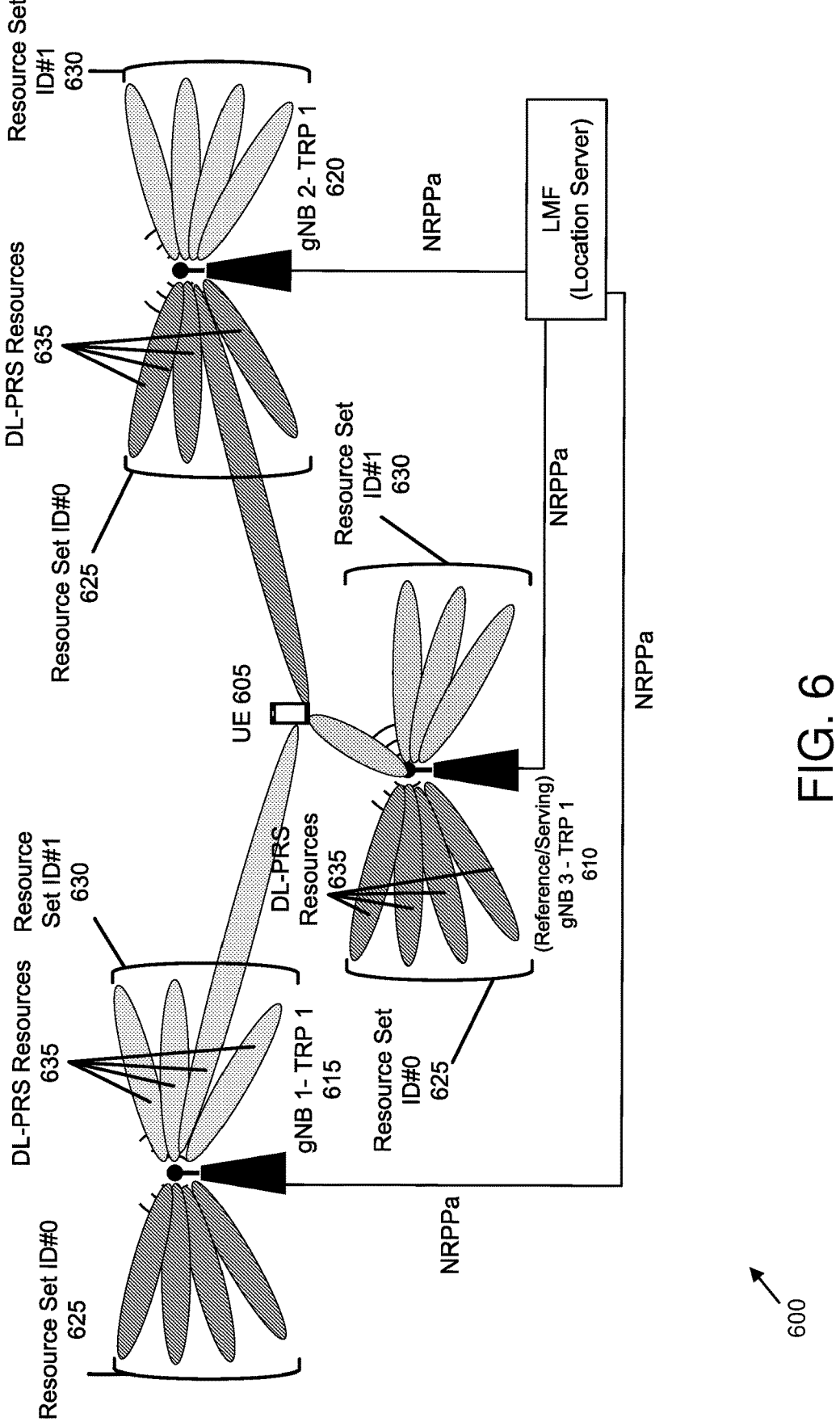
FIG. 6 is a diagram illustrating one embodiment of NR Beam-based positioning.

FIG. 6 depicts a system 600 for NR beam-based positioning. According to Rel-16, the PRS can be transmitted by different base stations (serving and neighboring) using narrow beams over Frequency Range #1 Between ("FR1", e.g., frequencies from 410 MHz to 7125 MHz) and Frequency Range #2 ("FR2", e.g., frequencies from 24.25 GHz to 52.6 GHz), which is relatively different when compared to LTE where the PRS was transmitted across the whole cell.

As illustrated in FIG. 6, a UE 605 may receive PRS from a first gNB ("gNB 3") 610, which is a serving gNB, and also from a neighboring second gNB ("gNB 1") 615, and a neighboring third gNB ("gNB 2") 620. Here, the PRS can be locally associated with a set of PRS Resources grouped under a Resource Set ID for a base station (e.g., TRP). In the depicted embodiments, each gNB 610, 615, 620 is configured with a first Resource Set ID 625 and a second Resource Set ID 630. As depicted, the UE 605 receives PRS on transmission beams; here, receiving PRS from the gNB 3 610 on a set of PRS Resources 635 from the second Resource Set ID 630, receiving PRS from the gNB 1 615 on a set of PRS Resources 635 from the second Resource Set ID 630, and receiving PRS from the gNB 2 620 on a set of PRS Resources 635 from the first Resource Set ID 625.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit to compute the target UE's location. Table 3 lists the RS-to-measurements mapping required for each of the supported RAT-dependent positioning techniques at the UE, and Table 4 lists the RS-to-measurements mapping required for each of the supported RAT-dependent positioning techniques at the gNB.

TABLE 3

| UE Measurements to enable RAT-dependent positioning techniques | | |
|---|---|---|
| DL/UL Reference Signals | UE Measurements | To facilitate support of the following positioning techniques |
| Rel-16 DL PRS | DL RSTD | DL-TDOA |
| Rel-16 DL PRS | DL PRS RSRP | DL-TDOA, DL-AOD, Multi-RTT |
| Rel-16 DL PRS/Rel-16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

TABLE 4

| gNB Measurements to enable RAT-dependent positioning techniques | | |
|---|---|---|
| DL/UL Reference Signals | gNB Measurements | To facilitate support of the following positioning techniques |
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx-Tx time difference | Multi-RTT |
| Rel-16 SRS for positioning, | A-AoA and Z-AoA | UL-AoA, Multi-RTT |

Figure 7A:
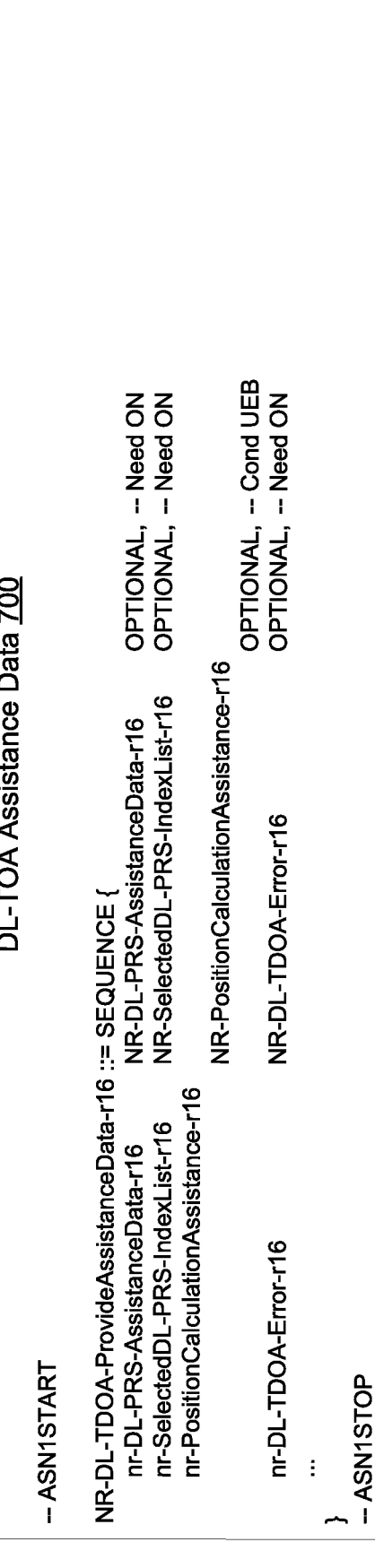
FIG. 7A is one embodiment of DL-TDOA assistance data.

According to TS38.215, UE measurements have been defined, which are applicable to DL-based positioning techniques (see subclause 2.4). For a conceptual overview of the current implementation in Rel-16, the DL-TDOA assistance data configurations (see FIG. 7A) and measurement reporting information (see FIG. 7B) are provided as illustrative examples. The IE NR-DL-TDOA-ProvideAssistanceData, shown in FIG. 7A, is used by the location server to provide assistance data to enable UE-assisted and UE-based NR downlink TDOA. It may also be used to provide NR DL TDOA positioning specific error reason.

The IE NR-DL-TDOA-SignalMeasurementInformation, shown in FIG. 7B, is used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

The different DL measurements including DL PRS-RSRP, DL RSTD and UE Rx-Tx Time Difference required for the supported RAT-dependent positioning techniques are shown in Table 5. The following measurement configurations are specified, e.g., in TS 38.215:

i. 4 Pair of DL RSTD measurements can be performed per pair of cells. Each measurement is performed between a different pair of DL PRS Resources/Resource Sets with a single reference timing.

ii. 8 DL PRS RSRP measurements can be performed on different DL PRS resources from the same cell.

TABLE 1

| DL Measurements required for DL-based positioning methods |
|---|

DL PRS reference signal received power (DL PRS-RSRP)

| | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

DL reference signal time difference (DL RSTD)

| | |
|---|---|
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

UE Rx – Tx time difference

| | |
|---|---|
| Definition | The UE Rx – Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency RRC_CONNECTED inter-frequency |

In one embodiment, the present disclosure includes signaling and configuration of different PRS types such as PRS type 1—Pseudo random sequence (e.g., based on a gold sequence), PRS type 2—Zadoff-chu sequence (e.g., generalized chirp-like sequence), and PRS type 3—Pulse based sequence. In one embodiment, the subject matter disclosed herein describes signaling the configuration of PRS types considering Mode 1 and Mode 2, physical sidelink control channel ("PSCCH") and PRS multiplexing, and transmission ("Tx") power level adaptation based on channel busy ratio ("CBR")/cognitive radio ("CR").

It is noted that, as used herein, a controller refers to a device that controls the ranging session and defines the ranging parameters by sending the ranging control information; a controlee refers to a device that utilizes the ranging parameters received from the controller by decoding the ranging control message; an initiator device, following the transmission/reception of the ranging control message, transmits the first ranging message exchange; and a responder device responds to the initial ranging message received from the initiator.

Accordingly, in one embodiment, the solutions described herein provide triggered ranging requests to enable or indicate to the lower layers to enable ranging based on a particular ranging service level. The ranging service level framework may be designed to meet the ranging accuracy, directional accuracy, and latency of a ranging location service request. In one embodiment, the proposed solution describes setup and closing procedures that are flexible to cater to unicast, groupcast, and broadcast ranging sessions. In one embodiment, the ranging discovery methods enable dynamic group management for ranging based on ranging discovery messages.

According to a first embodiment, one or more PRS type(s) could be (pre)configured per resource pool. In one example, at least one supported PRS type may be indicated to the gNB/LMF as part of the UE capability information. In another example, PRS type could be signaled by LMF using LTE positioning protocol ("LPP") signaling from the supported at least one PRS type.

In one implementation, when one or more PRS type(s) is configured/indicated/provided in a resource pool, a bitmap in terms of a logical sidelink slot is (pre)configured per PRS type in a resource pool so that the UE transmits and receives each PRS type according to the time domain bitmap configuration.

In another implementation, within the slots associated with a resource pool, the resources for each PRS type can be (pre)configured periodically with a period of N slot(s). In one example, the periodicity of each PRS type may be the same or different. In some examples, each PRS type resources can be (pre)configured with a slot-offset and/or a symbol-offset (e.g., the periodicity-offset may be jointly configured).

In another implementation, the slot index and/or periodicity for each PRS type relative to slot #0 of the radio frame corresponding to system frame number ("SFN") 0 of the serving cell, if serving cell timing reference is in use, or direct frame number ("DFN") 0.

In another implementation, one of the above configurations for a PRS type could be implemented in a sidelink ("SL") bandwidth part ("BWP") or a SL carrier instead in a resource pool.

In one embodiment, a number of repetitions for each PRS type could be (pre)configured in the resource pool otherwise number of repetitions is a function of CBR and/or priority of the positioning service, where the priority could be a value signaled/(pre)configured by the LMF based on the latency and/or accuracy of the positioning service. In some examples, the different repetitions for each PRS type may be associated with the same or different transmit or receive beam. A maximum number of reserved resources for PRS transmission may be (pre)configured per resource pool and, in one example, a maximum number of reserved resources could be (pre)configured per PRS type in a resource pool.

In one embodiment, downlink control information ("DCI") and/or sidelink control information ("SCI") indicate the PRS type used for transmitting the ranging signal using a bit(s). The associated configuration is described below:

a. PRS type 2: One or more of root sequence index of the PRS type 2, length of the preamble sequence, and a maximum number of cyclic shifts allowed in the resource pool to generate the preamble could be (pre) configured in a resource pool and/or configured using RRC signaling. A maximum number of cyclic shifts that can be allowed to be multiplexed in the same time/frequency resource could be (pre)configured in a resource pool and/or configured using RRC signaling. A cyclic shift could be signaled using the DCI signaling considering Mode 1 resource allocation. A Tx UE could transmit the cyclic shift value in the SCI to the Rx UE(s) before performing ranging, while the time and frequency domain assignment indicates the PRS type 2 resource in DCI and SCI. In one implementation, a cyclic shift could be selected based on the L1 source ID of Tx UE for unicast and/or the L1 source ID of Tx UE and the member ID of Rx UE in a groupcast. In another implementation, the number of cyclic shifts used for a PRS type 2 transmission that can be multiplexed in one PRS occasion or a ranging slot for transmission towards different ranging pairs is (pre)configured per resource pool.

b. PRS type 3: pulse duration is (pre)configured per resource pool and/or RRC signaling. Time domain resource for pulse transmission and/or number of pulse transmissions per slot/mini-slot are configured per resource pool. Pulse repetition frequency in a ranging slot can be (pre)configured in a resource pool.

In one embodiment, a shared resource pool configuration across gNBs and/or anchors have known locations for ranging methods requiring more than an anchor node (e.g., TDoA).

In one embodiment, anchor nodes with a known location can broadcast the PRS Type signals with a fixed periodicity for UE measurement of ranging. In one implementation, a source id of the anchor node and/or a time/frequency, a periodicity, and/or an offset of the PRS is provided as part of the assistance information to an initiator device by the LMF using LPP signaling. In another implementation, a source id of the anchor node and/or a time/frequency, a periodicity, and/or an offset of the PRS is (pre)configured in a resource pool.

In one embodiment, as used herein, figure of merit ("FoM") means the confidence level of the PHY estimate of the arrival of the reference marker, which is the pulse transmitted by the initiator to the responder. In another implementation, a confidence level is used to estimate the relative positioning using a positioning method such as TDoA, AoD, AoA, and/or the like. In one embodiment, a one-bit confidence interval request is present in the SCI transmitted by the initiator for unicast/groupcast and broadcast PRS transmission and the responder reports the confidence interval along with the positioning reports.

a. In one implementation, a confidence interval is (pre) configured in a resource pool or using RRC signaling indicating the maximum latency for the transmission of the confidence level;

b. In another implementation, a confidence interval is (pre)configured in a resource or using RRC signaling indicating the slot offset or a symbol offset between the request for the confidence level and the actual transmission of the confidence level;

c. In another implementation, a confidence level could be transmitted either using physical sidelink feedback channel ("PSFCH"), any L1 control signaling, or using a MAC CE. In one example, a confidence level is 0-2 bits.

In some embodiment, a PRS configuration defined for a resource pool is equally applicable for a sidelink BWP and/or sidelink carrier. In such cases, an RRC configuration could be used to signal the PRS configuration.

In some embodiments, since a large bandwidth is required for the PRS transmission to achieve high accuracy, a positioning resource pool could be overlapped across one or more data resource pool(s) in a BWP.

In some embodiments, in case of overlapping between sidelink PRS and physical sidelink shared channel ("PSSCH")/PSFCH in a same sidelink slot, the Tx UE, in one implementation, could prioritize either PRS or PSSCH/PSFCH based on the defined priority value of PRS and PSSCH/PSFCH. In another example, PSSCH/PSFCH is always prioritized. In another implementation, in case of overlapping between sidelink PRS and physical uplink shared channel ("PUSCH")/physical uplink control channel ("PUCCH") in the same time slot, a Tx UE could prioritize sidelink PRS when the priority of PUSCH is smaller compared to sl-Priority Threshold or sl-PriorityThreshold-UL-URLLC; otherwise, UL PUSCH/PUCCH is always prioritized.

In another implementation, in case of overlapping between sidelink PRS and sounding reference signal ("SRS") configured for positioning in the same time slot, a Tx UE could prioritize sidelink PRS when the priority of SRS is smaller compared to sl-PriorityThreshold or sl-PriorityThreshold-UL-URLLC; otherwise, SRS is always prioritized. In one embodiment, priority for the SRS is calculated based on the priority of the associated positioning request/session.

In terms of PRS type configuration, there could be a possibility that a UE1 e.g., Tx UE and it is configured to transmit PRS type 1 to UE2 e.g., Rx UE, but UE2 as Tx UE could be configured to transmit a same or different PRS type compared to that of transmitter. In this case, two possibilities could exist:

a. The same configuration for a PRS Type for a UE could be used for transmission as well as reception;

b. Two separate configurations for a PRS Type for UE— one to receive and another one to transmit (e.g., to a same or different UE).

Figure 8:
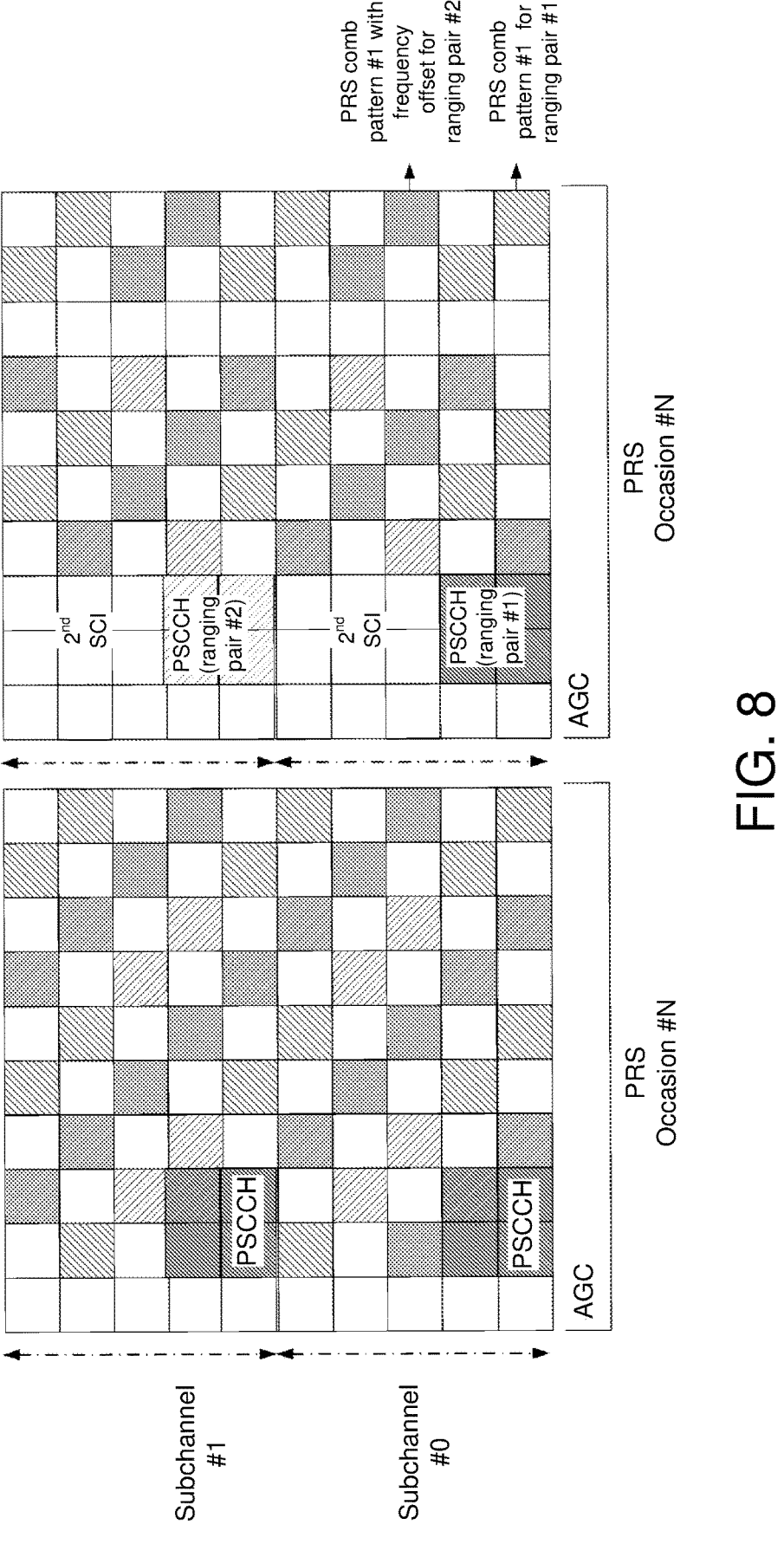
FIG. 8 is a diagram illustrating one embodiment of PRS Type 1 multiplexing with PSCCH—two options.

According to a second embodiment, for PRS type 1, PSCCH is transmitted in the symbol(s) 1-2 and PRS using a comb pattern is transmitted in the same slot. In one embodiment, PSCCH carries information corresponding to the PRS resource including one or more of the comb pattern ID, frequency offset, slot offset, symbol offset, number of PRS symbols in a slot, repetition factor, and/or muting pattern. In one example, PSCCH and PRS are multiplexed in time domain and frequency domain as shown in FIG. 8. Since the second PRS resource for a second ranging pair could be multiplexed in the same slot using a different frequency offset and transmitted over the entire signaled bandwidth, while the corresponding PSCCH is transmitted in the same slot but in an adjacent subchannel. In one implementation, two ranging signals could be transmitted in the same time slot using different frequency offset and/or comb pattern and their corresponding PSCCH are transmitted in the starting resource block ("RB") of each subchannel as configured per resource pool.

a. In one implementation, a PRS symbol starts with the symbol 2 and hence frequency division multiplexed ("FDMed") with a PSCCH location and the location of PRS is punctured for the transmission of PSCCH (in case of overlap between PSCCH and PRS).

b. In another implementation, a PRS symbol starts immediately after the PSCCH symbol and there is no FDM between PSCCH and PRS.

c. In another implementation, a PRS symbol is starting after a PSCCH symbol and there is no FDM between PSCCH and PRS. The second SCI, if present, is FDMed with PSCCH and transmitted in symbols 2 and 3, and the front-loaded demodulation reference signal ("DMRS") is transmitted for decoding the second SCI.

In one implementation, absence of second SCI is (pre) configured in a resource pool, which means the first SCI conveys positioning related information. In another implementation, a different second SCI format for conveying ranging-related information is signaled using one of the reserved values in the first SCI to define a second SCI format. In another implementation, a number of first SCI formats and/or second SCI formats for conveying ranging related information are (pre)configured in a resource pool.

In one embodiment, the PRS positioning method is signaled in the SCI based on an indicated reporting type using a bitmap where a plurality of reporting types could be signaled and each PRS transmission in a slot could be associated with one or more combinations of reporting types such as a received signal strength indicator ("RSSI"), TDOA, and/or the like. In one embodiment, each PRS repetition could be associated with a same, different, or a combination of positioning method/reporting type. Since the processing time for each of these positioning methods are different, slot/symbol offset for each of these positioning reporting types could be (pre)configured per resource pool and for the case where multiple positioning reports are requested (e.g., corresponding to different positioning methods), each of the positioning reports are separately transmitted according to the slot/symbol offset associated with the positioning reporting type. In one implementation, positioning reports are transmitted using PSFCH. In another implementation, positioning reports are transmitted using MAC CE.

In one embodiment, for PRS type 2, in this case the PRS is transmitted using Zadoff-chu sequence occupying a comb pattern (e.g., as for PRS type 1) or continuous physical resource blocks ("PRBs") and since a plurality of Zadoff-chu sequences corresponding to different ranging pairs could be transmitted using different cyclic shifts and occupying the same time/frequency resource. In one implementation, PSCCH corresponding to each ranging pair is transmitted in the starting RB of each sub-channels as configured per resource pool (first option (left) in FIG. 9).

Figure 9:
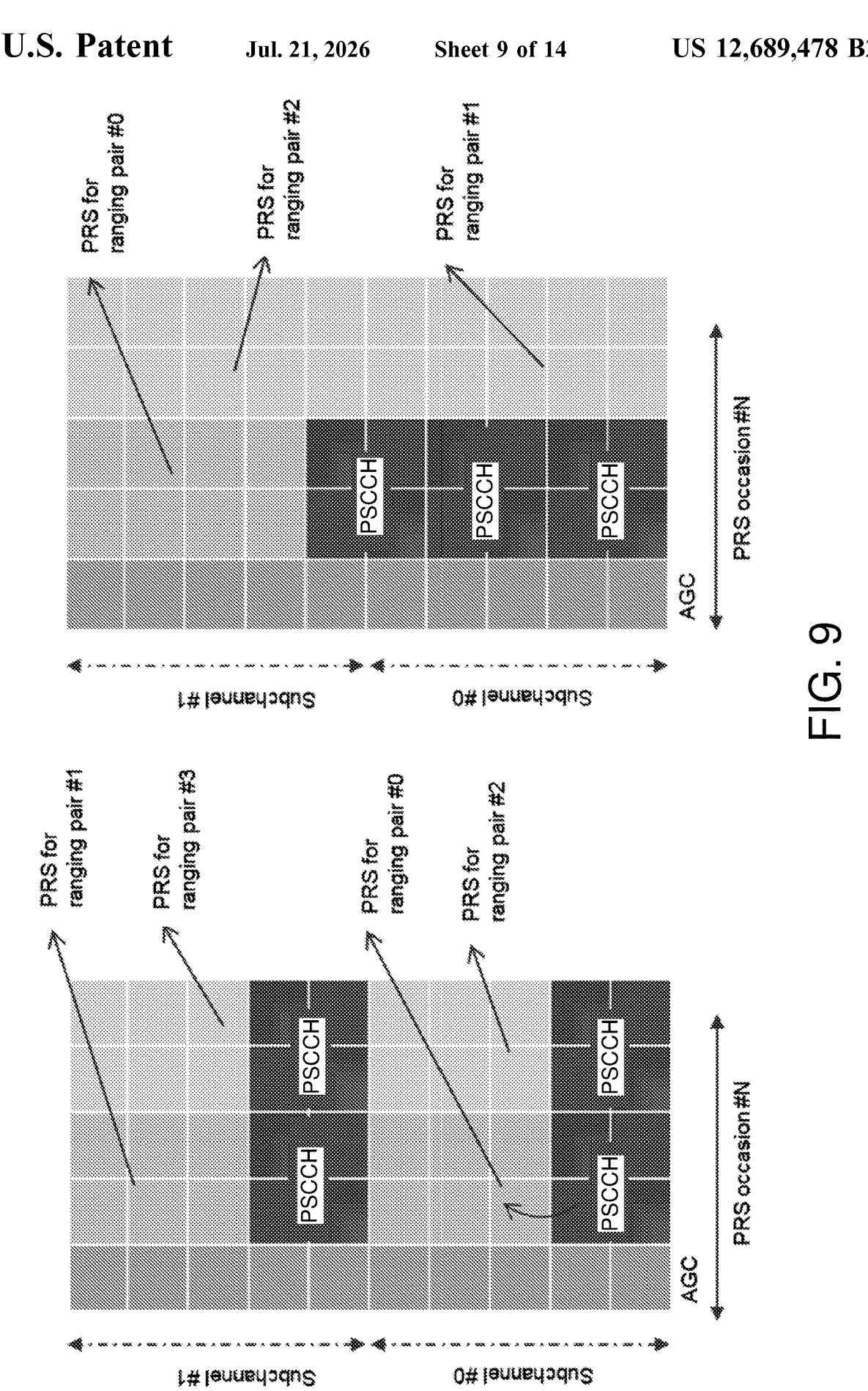
FIG. 9 is a diagram illustrating one embodiment of PRS type 2 multiplexing with PSCCH—two options.

In another implementation, PSCCH symbols and the number of PRBs for each PSCCH is defined per resource pool, which could be transmitted from the starting RB of the resource pool as shown in the FIG. 9 (second option (right) in FIG. 9), where each of the PSCCH resources are FDMed and carry information related to their ranging pairs with the remaining frequency resources used for the transmission of the PRS or second SCI, which is FDMed with the PSCCH resource. Compared to the first option, in one embodiment, a second option could provide continuous PRB mapping for the PRS type 2 signal. In FIG. 9, although ranging pair #0 and ranging pair #1 use different time/frequency resources, it is possible that these two ranging pairs could use the same time/frequency resources but using different cyclic shifts.

In one embodiment, in Mode 2 resource selection, a UE performs sensing to find the candidate time/frequency resource and/or cyclic shifts for PRS transmissions. In one implementation, a candidate resource set contains only candidate resources for PRS transmission based on a RSRP threshold and the UE autonomously selects the cyclic shift from the configured cyclic shift. In another implementation, the UE reports cyclic shifts to be used for each of the candidate resources reported in the candidate resource set while a MAC could randomly select one of the candidate resources and its corresponding cyclic shifts.

In one implementation, a candidate resource exclusion procedure compares the maximum number of cyclic shifts that can be used in the same time/frequency resource with that of the number of cyclic shifts used in the same time/frequency resource as a result of the sensing results. If the number of cyclic shifts is more than the maximum allowed number, then those time/frequency resources are excluded in the candidate resource selection.

In one implementation, a Tx UE could use the same cyclic shift for transmitting PRS in all reserved resources. In another implementation, a Tx UE could change the cyclic shift and signal this to the Rx UE in the SCI while transmitting in the reserved resources.

In the resource re-evaluation process, a Tx UE monitors SCI until m-T3, e.g., as described in TS38.214/38.331, to check whether there is any preemption indication from neighboring UEs. In case of PRS transmission, Tx UE monitors cyclic shifts in the SCI along with the time/frequency resource during resource re-evaluation and even if there is any overlap of time/frequency resource, Tx UE could use the same time/frequency resource for PRS transmission but using a different cyclic shift value. During the re-evaluation, however, when the Tx UE determines that the allowed number of cyclic shifts that is multiplexed in the same time/frequency resource is exceeded, then the Tx UE does not transmit in the pre-selected resource and could re-select another resource for PRS transmission from the candidate resource set to otherwise trigger resource (re) selection.

In one embodiment, for PRS type-3, PRS is transmitted using a pulse-based sequence spread across entire bandwidth of the resource pool. To occupy the entire bandwidth of a resource pool, the pulse length/duration of PRS type-3 in time domain needs to be (re)configured according to the resource pool bandwidth. In one implementation, the pulse duration is explicitly signaled via RRC per resource pool. In another implementation, the pulse duration is implicitly based on the resource pool bandwidth/SL BWP bandwidth or sidelink carrier bandwidth. A plurality of the pulse sequences is transmitted in a slot/mini-slot where each of the pulses can be associated with a different ranging pair and each SCI carries the pulse time offset associating each pulse offset of a pulse transmission to a different ranging pair. PSCCH and pulse sequences are transmitted in a time division multiplexed ("TDMed") manner and there is no FDM between PSCCH/PSSCH/PSFCH and pulse sequences (FIG. 10, left side).

Figure 10:
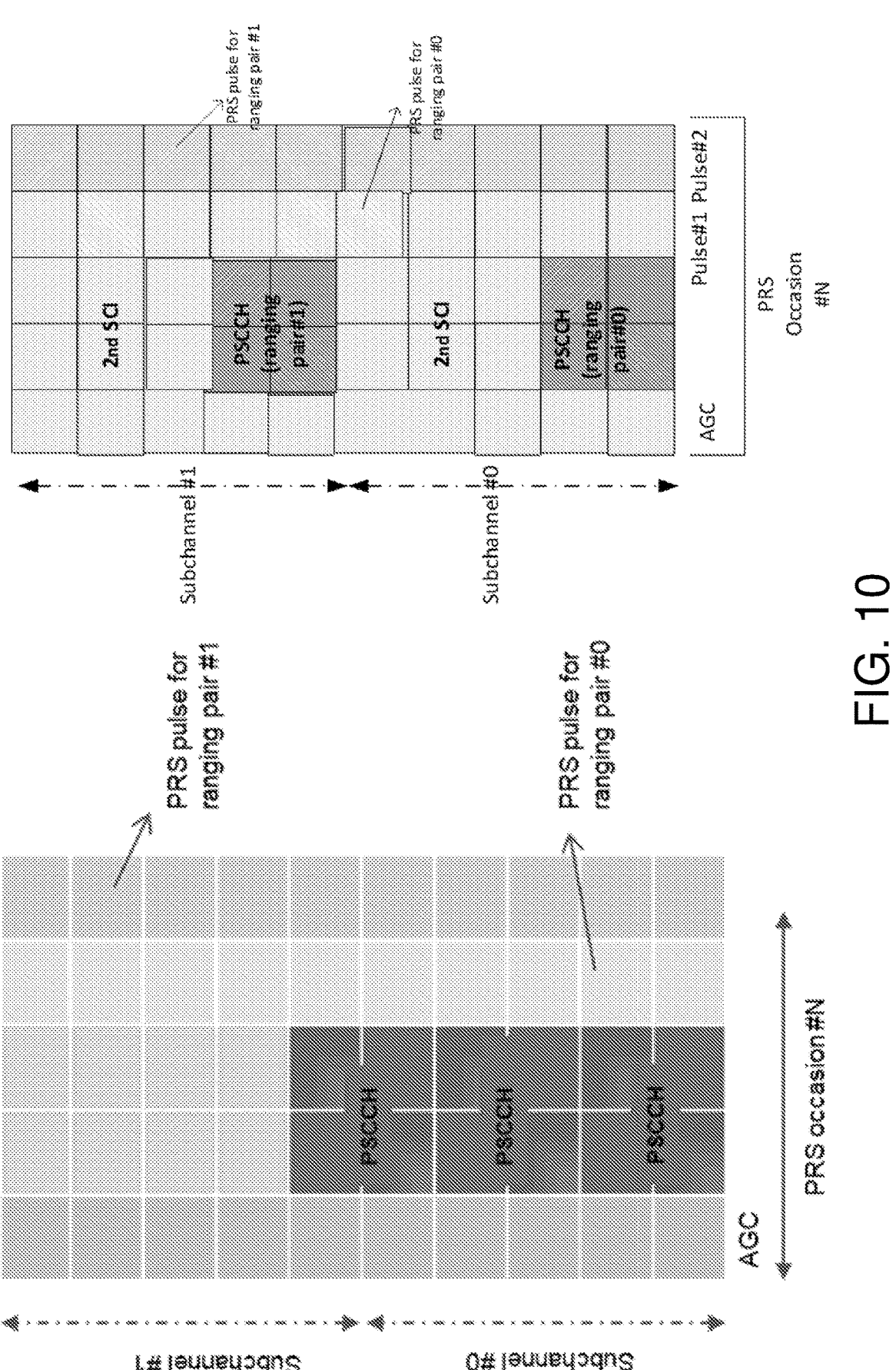
FIG. 10 is a diagram illustrating one embodiment of PRS type 3 multiplexing with PSCCH.

In another implementation, as shown in the FIG. 10 (right side), there could be N PSCCH/PSSCH symbol(s) defined per resource pool for first SCI and second SCI transmission, which could be FDMed and each of the first SCI is transmitted at the starting RB of the subchannel.

In one implementation, PSCCH symbols and a number of PRBs for each PSCCH is defined per resource pool, which could be transmitted from the starting RB of the resource pool as shown in FIG. 10, where each of the PSCCH resources are FDMed and carry information related to their ranging pairs, with the remaining frequency resource being used for the transmission of the second SCI, which is FDMed with the PSCCH resource.

In another implementation, there could be N pulse repetitions for the same ranging pair, which could be indicated in the SCI. In one embodiment, the positioning report contains the timestamp of the first pulse and then the relative timestamp difference from the first timestamp.

In another implementation, a pulse could be transmitted within the CP duration of the PSSCH while a pulse duration and the number of pulses that could be transmitted within the CP duration is (pre)configured per resource pool. In one embodiment, SCI indicates the presence of a ranging pulse in the CP duration of PSSCH. In one implementation, resource pool configuration specifies the PS SCH symbols in a slot that could be used for the transmission of the ranging pulse within the CP duration. In another implementation, the SCI indicates the PSSCH symbol number carrying the ranging pulse within the CP duration. In another implementation, a ranging pulse is not transmitted in PSSCH symbols carrying second SCI when the second SCI is carrying ranging related information. In one implementation, bandwidth of the pulse is limited to the bandwidth of the PSSCH. In one implementation, bandwidth of the pulse is independently configured in SCI as compared to that of PSSCH.

According to the embodiment 3, transmission of positioning reports in the PRS resource pool contains configuration for the transmission/reception of PSFCH and/or PSSCH, where several allocated symbols and periodicity of PSFCH and/or PSSCH symbols are (pre)configured per resource pool along with the PRS symbols (described in the first embodiment), especially for transmitting ranging reports. In one implementation, when a MAC CE is used for the transmission of ranging reports, PSCCH/PSSCH that are FDMed in those allocated symbols carry ranging reports using MAC CE and the hybrid automatic repeat request ("HARQ") feedback is not enabled for the transmission of MAC CE. In one embodiment, there could be a maximum latency configured for the transmission of this MAC CE carrying a ranging report to the initiator UE.

According to embodiment 4, transmission power of the PRS type 3 could be adapted based on the CBR/Channel Occupancy Ratio. In one example, when the channel is busy, the transmit power of the pulse sequence is reduced, and if the channel is free, the transmit power of the pulse sequence is increased. In another example, transmit power of the pulse sequence is configured as a function of the CBR and a plurality of transmit power values can be defined for a plurality of CBR values in a resource pool. In another example, transmit power of the pulse sequence may be based on whether a ranging pair (or an initiator device) is in-coverage or out-of-coverage of the network (e.g., lower transmit power when out-of-coverage compared to in-coverage; different maximum transmit power limits for in-coverage or out-of-coverage, and/or the like). In another implementation, there may be different maximum transmit power limits for licensed or unlicensed carriers.

Figure 11:
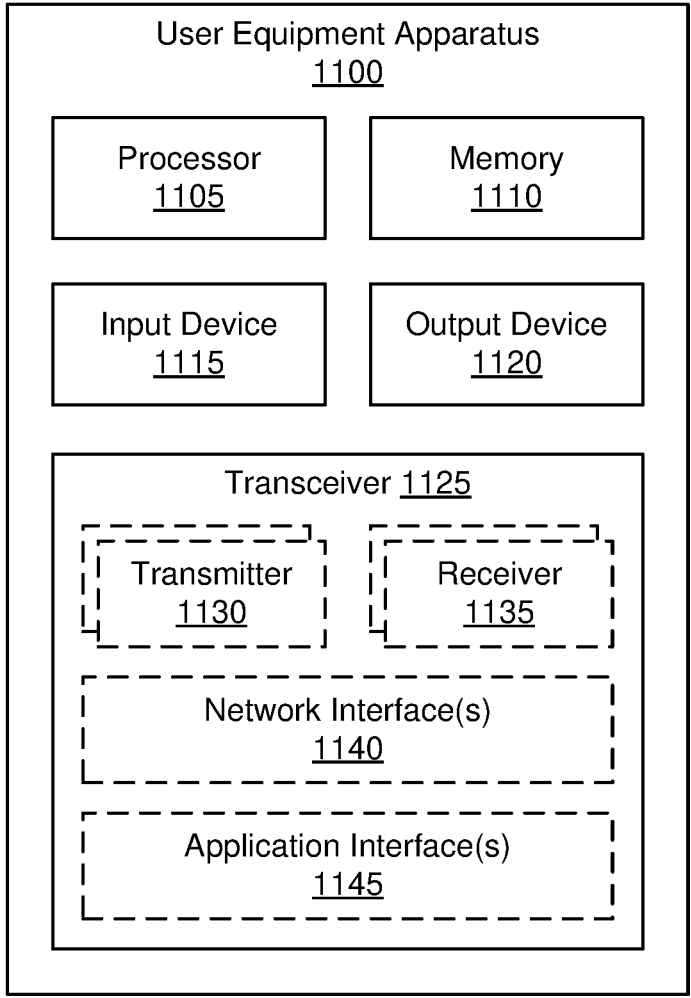
FIG. 11 is a block diagram illustrating one embodiment of a user equipment apparatus that may be used for sidelink ranging for positioning reference signal types.

FIG. 11 depicts a user equipment apparatus 1100 that may be used for sidelink ranging for positioning reference signal types, according to embodiments of the disclosure. In various embodiments, the user equipment apparatus 1100 is used to implement one or more of the solutions described above. The user equipment apparatus 1100 may be one embodiment of the remote unit 105 and/or the UE 205, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panels supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PC5, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement the above-described UE behaviors. In certain embodiments, the processor 1105 may include an application processor (also known as "main processor") which manages application-domain and operating system ("OS") functions and a base-band processor (also known as "baseband radio processor") which manages radio functions.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to sidelink ranging for positioning reference signal types. For example, the memory 1110 may store various parameters, panel/beam configurations, resource assignments, policies, and the like as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and to receive messages, data, and other signals. For example, the processor 1105 may selectively activate the transceiver 1125 (or portions thereof) at times to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi transceiver chip, a system-on-a-chip, an Application-Specific Integrated Circuit ("ASIC"), or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

In one embodiment, the transceiver 1125 receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the processor 1105 multiplexes the PSCCH with the PRS according to the multiplexing configuration. In one embodiment, the transceiver 1125 transmits the multiplexed PSCCH and PRS to the at least one second device according to the PRS configuration and the resource pool configuration.

In one embodiment, the resource pool configuration comprises at least one PRS type, each of the at least one PRS types associated with one or more of a pseudo-random sequence transmission, a Zadoff-chu sequence transmission, and a pulse-based sequence transmission.

In one embodiment, the PRS type comprises PRS type 1 and multiplexing the PSCCH with the PRS comprises frequency division multiplexing the PRS with the PSCCH location by starting a symbol of the PRS at a second symbol of a resource element, the location of the PRS being punctured for the transmission of the PSCCH.

In one embodiment, the PRS type comprises PRS type 1 and multiplexing the PSCCH with the PRS comprises starting the PRS symbol immediately after the PSCCH symbol of a resource element without frequency division multiplexing the PRS with the PSCCH.

In one embodiment, the processor 1105 further frequency division multiplexes sidelink control information ("SCI") with the PSCCH in symbols 2 and 3 of the resource element and the transceiver transmits the multiplexed SCI and PSCCH and a front-loaded demodulation reference signal for decoding the SCI.

In one embodiment, the PRS type comprises PRS type 2 and multiplexing the PSCCH with the PRS comprises transmitting PSCCH corresponding to a ranging pair in a starting resource block of each sub-channel of a resource element as configured for a resource pool.

In one embodiment, the PRS type comprises PRS type 2 and multiplexing the PSCCH with the PRS comprises defining PSCCH symbols and a plurality of physical resource blocks ("PRBs") for a resource pool and transmitting the PSCCH symbols from a starting resource block of the of the resource pool, each PSCCH resource multiplexed and comprising information related to associated ranging pairs.

In one embodiment, the PRS type comprises PRS type 3 and multiplexing the PSCCH with the PRS comprises time division multiplexing the PSCCH and pulse sequence of the PRS without frequency division multiplexing the PSCCH and the pulse sequence.

In one embodiment, the PRS type comprises PRS type 3 and multiplexing the PSCCH with the PRS comprises defining a plurality of PSCCH symbols per resource pool for a first sidelink control information ("SCI") transmission and a second SCI transmission, the first and second SCIs frequency division multiplexed, the first SCI transmitted at a starting resource block of a subchannel of the resource element.

In one embodiment, the PRS type comprises PRS type 3 and multiplexing the PSCCH with the PRS comprises defining PSCCH symbols and a plurality of physical resource blocks ("PRBs") for each PSCCH for a resource pool and transmitting the PSCCH symbols from a starting resource block of the of the resource pool, each PSCCH resource frequency division multiplexed and comprising information associated with an associated ranging pair, any remaining frequency resource used for transmitting a sidelink control information ("SCI") that is frequency division multiplexed with a PSCCH resource.

In one embodiment, the resource pool configuration comprises a bitmap defined in symbols and logical sidelink slots for each PRS type.

In one embodiment, the resource pool configuration comprises a processing time offset for each positioning method associated with each PRS type.

In one embodiment, the resource pool configuration for a type 2 PRS comprises a root sequence identifier and a dynamic signaling of cyclic shift values.

In one embodiment, the resource pool configuration for a type 3 PRS comprises a pulse duration and a dynamic signaling of offset of the pulse transmitted from sidelink control information ("SCI") for each ranging pair.

In one embodiment, transceiver 1125 receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

Figure 12:
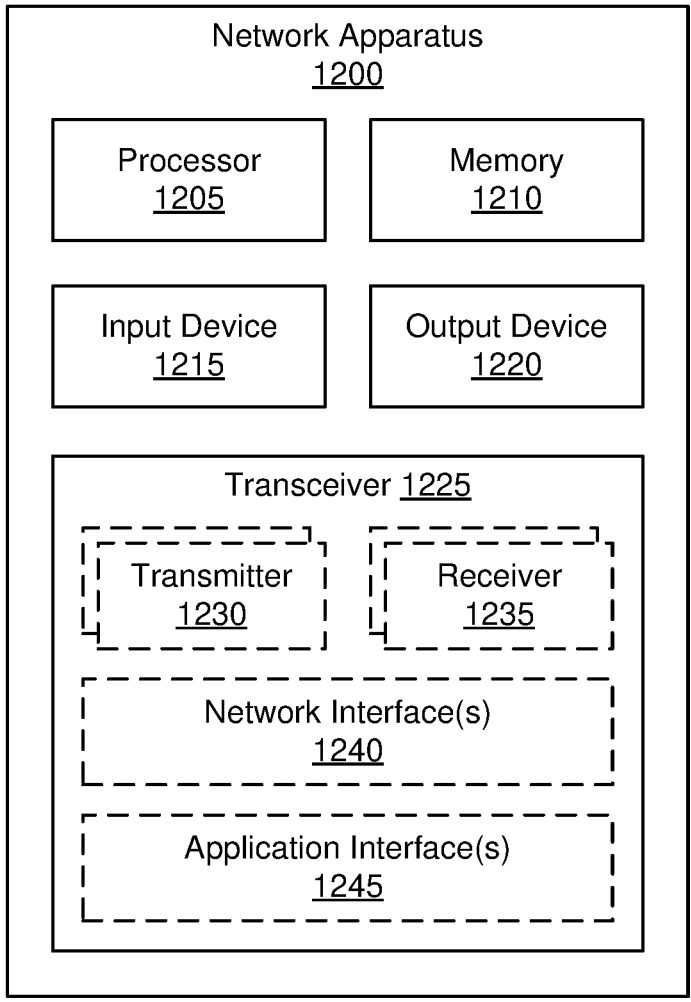
FIG. 12 is a block diagram illustrating one embodiment of a network equipment apparatus that may be used for sidelink ranging for positioning reference signal types.

FIG. 12 depicts a network apparatus 1200 that may be used for sidelink ranging for positioning reference signal types, according to embodiments of the disclosure. In one embodiment, network apparatus 1200 may be one implementation of a RAN node, such as the base unit 121 and/or the RAN node 210, as described above. Furthermore, the base network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 175. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the network apparatus 1200 is a RAN node (e.g., gNB) that communicates with one or more UEs, as described herein. In such embodiments, the processor 1205 controls the network apparatus 1200 to perform the above-described RAN behaviors. When operating as a RAN node, the processor 1205 may include an application processor (also known as "main processor") which manages application-domain and operating system ("OS") functions and a baseband processor (also known as "baseband radio processor") which manages radio functions.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to sidelink ranging for positioning reference signal types. For example, the memory 1210 may store parameters, configurations, resource assignments, policies, and the like, as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the PLMN and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

In one embodiment, the transceiver 1225 receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the processor 1205 multiplexes the PSCCH with the PRS according to the multiplexing configuration. In one embodiment, the transceiver 1225 transmits the multiplexed PSCCH and PRS to the at least one second device according to the PRS configuration and the resource pool configuration.

In one embodiment, the resource pool configuration comprises at least one PRS type, each of the at least one PRS types associated with one or more of a pseudo-random sequence transmission, a Zadoff-chu sequence transmission, and a pulse-based sequence transmission.

In one embodiment, the PRS type comprises PRS type 1 and multiplexing the PSCCH with the PRS comprises frequency division multiplexing the PRS with the PSCCH location by starting a symbol of the PRS at a second symbol of a resource element, the location of the PRS being punctured for the transmission of the PSCCH.

In one embodiment, the PRS type comprises PRS type 1 and multiplexing the PSCCH with the PRS comprises starting the PRS symbol immediately after the PSCCH symbol of a resource element without frequency division multiplexing the PRS with the PSCCH.

In one embodiment, the processor 1205 further frequency division multiplexes sidelink control information ("SCI") with the PSCCH in symbols 2 and 3 of the resource element and the transceiver transmits the multiplexed SCI and PSCCH and a front-loaded demodulation reference signal for decoding the SCI.

In one embodiment, the PRS type comprises PRS type 2 and multiplexing the PSCCH with the PRS comprises transmitting PSCCH corresponding to a ranging pair in a starting to resource block of each sub-channel of a resource element as configured for a resource pool.

In one embodiment, the PRS type comprises PRS type 2 and multiplexing the PSCCH with the PRS comprises defining PSCCH symbols and a plurality of physical resource blocks ("PRBs") for a resource pool and transmitting the PSCCH symbols from a starting resource block of the of the resource pool, each PSCCH resource multiplexed and comprising information related to associated ranging pairs.

In one embodiment, the PRS type comprises PRS type 3 and multiplexing the PSCCH with the PRS comprises time division multiplexing the PSCCH and pulse sequence of the PRS without frequency division multiplexing the PSCCH and the pulse sequence.

In one embodiment, the PRS type comprises PRS type 3 and multiplexing the PSCCH with the PRS comprises defining a plurality of PSCCH symbols per resource pool for a first sidelink control information ("SCI") transmission and a second SCI transmission, the first and second SCIs frequency division multiplexed, the first SCI transmitted at a starting resource block of a subchannel of the resource element.

In one embodiment, the PRS type comprises PRS type 3 and multiplexing the PSCCH with the PRS comprises defining PSCCH symbols and a plurality of physical resource blocks ("PRBs") for each PSCCH for a resource pool and transmitting the PSCCH symbols from a starting resource block of the of the resource pool, each PSCCH resource frequency division multiplexed and comprising information associated with an associated ranging pair, any remaining frequency resource used for transmitting a sidelink control information ("SCI") that is frequency division multiplexed with a PSCCH resource.

In one embodiment, the resource pool configuration comprises a bitmap defined in symbols and logical sidelink slots for each PRS type.

In one embodiment, the resource pool configuration comprises a processing time offset for each positioning method associated with each PRS type.

In one embodiment, the resource pool configuration for a type 2 PRS comprises a root sequence identifier and a dynamic signaling of cyclic shift values.

In one embodiment, the resource pool configuration for a type 3 PRS comprises a pulse duration and a dynamic signaling of offset of the pulse transmitted from sidelink control information ("SCI") for each ranging pair.

In one embodiment, transceiver 1225 receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

Figure 13:
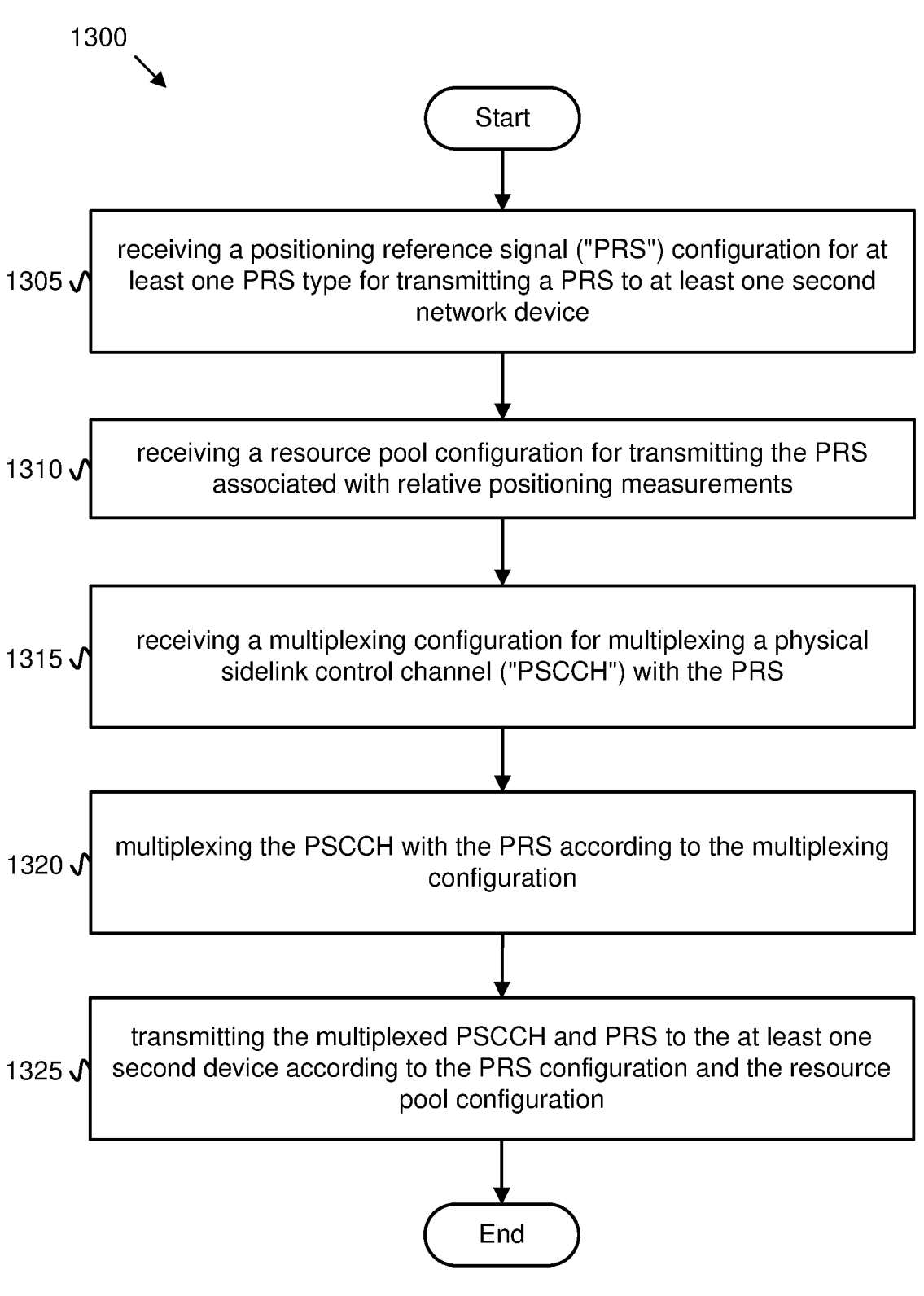
FIG. 13 is a block diagram illustrating one embodiment of a first method for sidelink ranging for positioning reference signal types.

FIG. 13 depicts one embodiment of a method 1300 for sidelink ranging for positioning reference signal types, according to embodiments of the disclosure. In various embodiments, the method 1300 is performed by a user equipment device in a mobile communication network, such as the remote unit 105, the UE 205, and/or the user equipment apparatus 1100, described above, and/or a network equipment apparatus 1200, such as base unit 121. In some embodiments, the method 1300 is performed by a processor, such as a microcontroller, a microprocessor, a CPU, a GPU, an auxiliary processing unit, a FPGA, or the like.

In one embodiment, the method 1300 begins and receives 1305 a positioning reference signal ("PRS") configuration for at least one PRS type for transmitting a PRS to at least one second network device. In one embodiment, the method 1300 receives 1310 a resource pool configuration for transmitting the PRS associated with relative positioning measurements. In one embodiment, the method 1300 receives 1315 a multiplexing configuration for multiplexing a physical sidelink control channel ("PSCCH") with the PRS. In one embodiment, the method 1300 multiplexes 1320 the PSCCH with the PRS according to the multiplexing configuration. In one embodiment, the method 1300 transmits 1325 the multiplexed PSCCH and PRS to the at least one second device according to the PRS configuration and the resource pool configuration. The method 1300 ends.

FIG. 14 depicts one embodiment of a method 1400 for sidelink ranging for positioning reference signal types, according to embodiments of the disclosure. In various embodiments, the method 1400 is performed by a user equipment device in a mobile communication network, such as the remote unit 105, the UE 205, and/or the user equipment apparatus 1100, described above, and/or a network equipment apparatus 1200, such as base unit 121. In some embodiments, the method 1700 is performed by a processor, such as a microcontroller, a microprocessor, a CPU, a GPU, an auxiliary processing unit, a FPGA, or the like.

In one embodiment, the method 1400 begins and receives 1405 a positioning reference signal ("PRS") configuration for at least one PRS type for receiving a PRS from at least one second network device. In one embodiment, the method 1400 receives 1410 a resource pool configuration for receiving a configured ranging signal type associated with relative positioning measurements. In one embodiment, the method 1400 receives 1415 a multiplexing configuration associated with multiplexing a physical sidelink control channel ("PSCCH") with the PRS. In one embodiment, the method 1400 receives 1420 a ranging signal from the at least one second network device according to the received PRS configuration, the resource pool configuration, and the multiplexing configuration. The method 1400 ends.

Disclosed herein is a first apparatus for sidelink ranging for positioning reference signal types, according to embodiments of the disclosure. The first apparatus may be implemented by a user equipment device in a mobile communication network, such as the remote unit 105, the UE 205, and/or the user equipment apparatus 1100, described above, and/or a network equipment apparatus 1200, such as base unit 121. In one embodiment, the first apparatus is implemented by a processor, such as a microcontroller, a microprocessor, a CPU, a GPU, an auxiliary processing unit, a FPGA, or the like.

In one embodiment, the first apparatus includes transceiver that receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the first apparatus includes a processor that multiplexes the PSCCH with the PRS according to the multiplexing configuration. In one embodiment, the transceiver transmits the multiplexed PSCCH and PRS to the at least one second device according to the PRS configuration and the resource pool configuration.

In one embodiment, the resource pool configuration comprises at least one PRS type, each of the at least one PRS types associated with one or more of a pseudo-random sequence transmission, a Zadoff-chu sequence transmission, and a pulse-based sequence transmission.

In one embodiment, the PRS type comprises PRS type 1 and multiplexing the PSCCH with the PRS comprises frequency division multiplexing the PRS with the PSCCH location by starting a symbol of the PRS at a second symbol of a resource element, the location of the PRS being punctured for the transmission of the PSCCH.

In one embodiment, the PRS type comprises PRS type 1 and multiplexing the PSCCH with the PRS comprises starting the PRS symbol immediately after the PSCCH symbol of a resource element without frequency division multiplexing the PRS with the PSCCH.

In one embodiment, the processor further frequency division multiplexes sidelink control information ("SCI") with the PSCCH in symbols 2 and 3 of the resource element and the transceiver transmits the multiplexed SCI and PSCCH and a front-loaded demodulation reference signal for decoding the SCI.

In one embodiment, the PRS type comprises PRS type 2 and multiplexing the PSCCH with the PRS comprises transmitting PSCCH corresponding to a ranging pair in a starting resource block of each sub-channel of a resource element as configured for a resource pool.

In one embodiment, the PRS type comprises PRS type 2 and multiplexing the PSCCH with the PRS comprises defining PSCCH symbols and a plurality of physical resource blocks ("PRBs") for a resource pool and transmitting the PSCCH symbols from a starting resource block of the of the resource pool, each PSCCH resource multiplexed and comprising information related to associated ranging pairs.

In one embodiment, the PRS type comprises PRS type 3 and multiplexing the PSCCH with the PRS comprises time division multiplexing the PSCCH and pulse sequence of the PRS without frequency division multiplexing the PSCCH and the pulse sequence.

In one embodiment, the PRS type comprises PRS type 3 and multiplexing the PSCCH with the PRS comprises defining a plurality of PSCCH symbols per resource pool for a first sidelink control information ("SCI") transmission and a second SCI transmission, the first and second SCIs frequency division multiplexed, the first SCI transmitted at a starting resource block of a subchannel of the resource element.

In one embodiment, the PRS type comprises PRS type 3 and multiplexing the PSCCH with the PRS comprises defining PSCCH symbols and a plurality of physical resource blocks ("PRBs") for each PSCCH for a resource pool and transmitting the PSCCH symbols from a starting resource block of the of the resource pool, each PSCCH resource frequency division multiplexed and comprising information associated with an associated ranging pair, any remaining frequency resource used for transmitting a sidelink control information ("SCI") that is frequency division multiplexed with a PSCCH resource.

In one embodiment, the resource pool configuration comprises a bitmap defined in symbols and logical sidelink slots for each PRS type.

In one embodiment, the resource pool configuration comprises a processing time offset for each positioning method associated with each PRS type.

In one embodiment, the resource pool configuration for a type 2 PRS comprises a root sequence identifier and a dynamic signaling of cyclic shift values.

In one embodiment, the resource pool configuration for a type 3 PRS comprises a pulse duration and a dynamic signaling of offset of the pulse transmitted from sidelink control information ("SCI") for each ranging pair.

Disclosed herein is a first method for sidelink ranging for positioning reference signal types, according to embodiments of the disclosure. The first method is performed by a user equipment device in a mobile communication network, such as the remote unit 105, the UE 205, and/or the user equipment apparatus 1100, described above, and/or a network equipment apparatus 1200, such as base unit 121. In some embodiments, the first method is performed by a processor, such as a microcontroller, a microprocessor, a CPU, a GPU, an auxiliary processing unit, a FPGA, or the like.

In one embodiment, the first method receives a positioning reference signal ("PRS") configuration for at least one PRS type for transmitting a PRS to at least one second network device, receives a resource pool configuration for transmitting the PRS associated with relative positioning measurements, and receives a multiplexing configuration for multiplexing a physical sidelink control channel ("PSCCH") with the PRS. In one embodiment, the first method multiplexes the PSCCH with the PRS according to the multiplexing configuration. In one embodiment, the first method transmits the multiplexed PSCCH and PRS to the at least one second device according to the PRS configuration and the resource pool configuration.

In one embodiment, the resource pool configuration comprises at least one PRS type, each of the at least one PRS types associated with one or more of a pseudo-random sequence transmission, a Zadoff-chu sequence transmission, and a pulse-based sequence transmission.

In one embodiment, the PRS type comprises PRS type 1 and multiplexing the PSCCH with the PRS comprises frequency division multiplexing the PRS with the PSCCH location by starting a symbol of the PRS at a second symbol of a resource element, the location of the PRS being punctured for the transmission of the PSCCH.

In one embodiment, the PRS type comprises PRS type 1 and multiplexing the PSCCH with the PRS comprises starting the PRS symbol immediately after the PSCCH symbol of a resource element without frequency division multiplexing the PRS with the PSCCH.

In one embodiment, the first method further frequency division multiplexes sidelink control information ("SCI") with the PSCCH in symbols 2 and 3 of the resource element and the transceiver transmits the multiplexed SCI and PSCCH and a front-loaded demodulation reference signal for decoding the SCI.

In one embodiment, the PRS type comprises PRS type 2 and multiplexing the PSCCH with the PRS comprises transmitting PSCCH corresponding to a ranging pair in a starting resource block of each sub-channel of a resource element as configured for a resource pool.

In one embodiment, the PRS type comprises PRS type 2 and multiplexing the PSCCH with the PRS comprises defining PSCCH symbols and a plurality of physical resource blocks ("PRBs") for a resource pool and transmitting the PSCCH symbols from a starting resource block of the of the resource pool, each PSCCH resource multiplexed and comprising information related to associated ranging pairs.

In one embodiment, the PRS type comprises PRS type 3 and multiplexing the PSCCH with the PRS comprises time division multiplexing the PSCCH and pulse sequence of the PRS without frequency division multiplexing the PSCCH and the pulse sequence.

In one embodiment, the PRS type comprises PRS type 3 and multiplexing the PSCCH with the PRS comprises defining a plurality of PSCCH symbols per resource pool for a first sidelink control information ("SCI") transmission and a second SCI transmission, the first and second SCIs frequency division multiplexed, the first SCI transmitted at a starting resource block of a subchannel of the resource element.

In one embodiment, the PRS type comprises PRS type 3 and multiplexing the PSCCH with the PRS comprises defining PSCCH symbols and a plurality of physical resource blocks ("PRBs") for each PSCCH for a resource pool and transmitting the PSCCH symbols from a starting resource block of the of the resource pool, each PSCCH resource frequency division multiplexed and comprising information associated with an associated ranging pair, any remaining frequency resource used for transmitting a sidelink control information ("SCI") that is frequency division multiplexed with a PSCCH resource.

In one embodiment, the resource pool configuration comprises a bitmap defined in symbols and logical sidelink slots for each PRS type.

In one embodiment, the resource pool configuration comprises a processing time offset for each positioning method associated with each PRS type.

In one embodiment, the resource pool configuration for a type 2 PRS comprises a root sequence identifier and a dynamic signaling of cyclic shift values.

In one embodiment, the resource pool configuration for a type 3 PRS comprises a pulse duration and a dynamic signaling of offset of the pulse transmitted from sidelink control information ("SCI") for each ranging pair.

Disclosed herein is a second apparatus for sidelink ranging for positioning reference signal types, according to embodiments of the disclosure. The second apparatus may be implemented by a user equipment device in a mobile communication network, such as the remote unit 105, the UE 205, and/or the user equipment apparatus 1100, described above, and/or a network equipment apparatus 1200, such as base unit 121. In one embodiment, the second apparatus is implemented by a processor, such as a microcontroller, a microprocessor, a CPU, a GPU, an auxiliary processing unit, a FPGA, or the like.

In one embodiment, the second apparatus includes a transceiver that receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

Disclosed herein is a second method for sidelink ranging for positioning reference signal types, according to embodiments of the disclosure. The second method is performed by a user equipment device in a mobile communication network, such as the remote unit 105, the UE 205, and/or the user equipment apparatus 1100, described above, and/or a network equipment apparatus 1200, such as base unit 121. In some embodiments, the second method is performed by a processor, such as a microcontroller, a microprocessor, a CPU, a GPU, an auxiliary processing unit, a FPGA, or the like.

In one embodiment, the second method receives a positioning reference signal ("PRS") configuration for at least one PRS type for receiving a PRS from at least one second network device, receives a resource pool configuration for receiving a configured ranging signal type associated with relative positioning measurements, receives a multiplexing configuration associated with multiplexing a physical sidelink control channel ("PSCCH") with the PRS, and receives a ranging signal from the at least one second network device according to the received PRS configuration, the resource pool configuration, and the multiplexing configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment (NE) for wireless communication, comprising:

at least one memory; and at least one processor coupled with the at least one memory and configured to cause the NE to:

receive a positioning reference signal ("PRS") configuration for at least one PRS type for transmitting a PRS to at least one second NE;

receive a resource pool configuration for transmitting the PRS associated with relative positioning measurements;

receive a multiplexing configuration for multiplexing a physical sidelink control channel ("PSCCH") with the PRS;

multiplex the PSCCH with the PRS according to the multiplexing configuration; and transmit, in a same slot as the PSCCH and after a final PSCCH symbol without frequency-division multiplexing, the multiplexed PSCCH and PRS to the at least one second NE according to the PRS configuration and the resource pool configuration.

2. The NE of claim 1, wherein the resource pool configuration comprises at least one PRS type, the at least one PRS type associated with a pseudo-random sequence transmission, a Zadoff-chu sequence transmission, a pulse-based sequence transmission, or a combination thereof.

3. The NE of claim 1, wherein the at least one PRS type comprises PRS type 1 and wherein the at least one processor is configured to cause the NE to multiplex the PSCCH with the PRS by frequency division multiplexing the PRS with a PSCCH location by starting a symbol of the PRS at a second symbol of a resource element, a location of the PRS being punctured for transmission of the PSCCH.

4. The NE of claim 1, wherein the at least one PRS type comprises PRS type 1 and wherein the at least one processor is configured to cause the NE to multiplex the PSCCH with the PRS by starting a PRS symbol immediately after a PSCCH symbol of a resource element without frequency division multiplexing the PRS with the PSCCH.

5. The NE of claim 4, wherein the at least one processor is configured to cause the NE to frequency division multiplex sidelink control information ("SCI") with the PSCCH in symbols 2 and 3 of the resource element and transmit the multiplexed SCI and PSCCH and a front-loaded demodulation reference signal for decoding the SCI.

6. The NE of claim 1, wherein the at least one PRS type comprises PRS type 2 and wherein the at least one processor is configured to cause the NE to multiplex the PSCCH with the PRS by transmitting PSCCH corresponding to a ranging pair in a starting resource block of each sub-channel of a resource element as configured for a resource pool.

7. The NE of claim 1, wherein the at least one PRS type comprises PRS type 2 and wherein the at least one processor is configured to cause the NE to multiplex the PSCCH with the PRS by defining PSCCH symbols and a plurality of physical resource blocks ("PRBs") for a resource pool and transmit the PSCCH symbols from a starting resource block of the resource pool, wherein each PSCCH resource is multiplexed and comprises information related to associated ranging pairs.

8. The NE of claim 1, wherein the at least one PRS type comprises PRS type 3 and wherein the at least one processor is configured to cause the NE to multiplex the PSCCH with the PRS by time division multiplexing the PSCCH and a pulse sequence of the PRS without frequency division multiplexing the PSCCH and the pulse sequence.

9. The NE of claim 1, wherein the at least one PRS type comprises PRS type 3 and wherein the at least one processor is configured to cause the NE to multiplex the PSCCH with the PRS by defining a plurality of PSCCH symbols per resource pool for a first sidelink control information ("SCI") transmission and a second SCI transmission, and wherein the first and second SCI transmissions are frequency division multiplexed, the first SCI transmission beginning at a starting resource block of a subchannel of a resource element.

10. The NE of claim 1, wherein the at least one PRS type comprises PRS type 3 and wherein the at least one processor is configured to cause the NE to multiplex the PSCCH with the PRS by defining PSCCH symbols and a plurality of physical resource blocks ("PRBs") for each PSCCH for a resource pool and transmitting the PSCCH symbols from a starting resource block of the resource pool, each PSCCH resource frequency division multiplexed and comprising information associated with a ranging pair, wherein remaining frequency resources are used for transmitting a sidelink control information ("SCI") that is frequency division multiplexed with a PSCCH resource.

11. The NE of claim 1, wherein the resource pool configuration comprises a bitmap defined in symbols, logical sidelink slots for each PRS type, a processing time offset for each positioning method associated with each PRS type, or a combination thereof.

12. The NE of claim 1, wherein the resource pool configuration for a type 2 PRS comprises a root sequence identifier and a dynamic signaling of cyclic shift values.

13. The NE of claim 1, wherein the resource pool configuration for a type 3 PRS comprises a pulse duration and a dynamic signaling of offset of a pulse transmitted from sidelink control information ("SCI") for each ranging pair.

14. A method performed by a network equipment (NE), the method comprising:

receiving a positioning reference signal ("PRS") configuration for at least one PRS type for transmitting a PRS to at least one second NE;

receiving a resource pool configuration for transmitting the PRS associated with relative positioning measurements;

receiving a multiplexing configuration for multiplexing a physical sidelink control channel ("PSCCH") with the PRS;

multiplexing the PSCCH with the PRS according to the multiplexing configuration; and transmitting, in a same slot as the PSCCH and after a final PSCCH symbol without frequency-division multiplexing, the multiplexed PSCCH and PRS to the at least one second NE according to the PRS configuration and the resource pool configuration.

15. A network equipment (NE) for wireless communication, comprising:

at least one memory; and at least one processor coupled with the at least one memory and configured to cause the NE to:

receive a positioning reference signal ("PRS") configuration for at least one PRS type for receiving a PRS from at least one second NE;

receive a resource pool configuration for receiving a configured ranging signal type associated with relative positioning measurements;

receive a multiplexing configuration associated with multiplexing a physical sidelink control channel ("PSCCH") with the PRS; and receive, in a same slot as the PSCCH and after a final PSCCH symbol without frequency-division multiplexing, a ranging signal from the at least one second NE according to the received PRS configuration, the resource pool configuration, and the multiplexing configuration.

16. A processor for wireless communication, comprising:

at least one controller coupled with at least one memory and configured to cause the processor to:

receive a positioning reference signal ("PRS") configuration for at least one PRS type for transmitting a PRS to a network equipment;

receive a resource pool configuration for transmitting the PRS associated with relative positioning measurements;

receive a multiplexing configuration for multiplexing a physical sidelink control channel ("PSCCH") with the PRS;

multiplex the PSCCH with the PRS according to the multiplexing configuration; and transmit, in a same slot as the PSCCH and after a final PSCCH symbol without frequency-division multiplexing, the multiplexed PSCCH and PRS to the network equipment according to the PRS configuration and the resource pool configuration.

17. The processor of claim 16, wherein the resource pool configuration comprises at least one PRS type, the at least one PRS type associated with a pseudo-random sequence transmission, a Zadoff-chu sequence transmission, a pulse-based sequence transmission, or a combination thereof.

18. The processor of claim 16, wherein the at least one PRS type comprises PRS type 1 and wherein the at least one controller is configured to cause the processor to multiplex the PSCCH with the PRS by frequency division multiplexing the PRS with a PSCCH location by starting a symbol of the PRS at a second symbol of a resource element, a location of the PRS being punctured for transmission of the PSCCH.

19. The processor of claim 16, wherein the at least one PRS type comprises PRS type 1 and wherein the at least one controller is configured to cause the processor to multiplex the PSCCH with the PRS by starting a PRS symbol immediately after a PSCCH symbol of a resource element without frequency division multiplexing the PRS with the PSCCH.

20. The processor of claim 19, wherein the at least one controller is configured to cause the processor to frequency division multiplex sidelink control information ("SCI") with the PSCCH in symbols 2 and 3 of the resource element and transmit the SCI and PSCCH and a front-loaded demodulation reference signal for decoding the SCI.

* * * * *